(12) United States Patent
Orfanoudakis et al.

(10) Patent No.: US 11,506,195 B2
(45) Date of Patent: Nov. 22, 2022

(54) METHOD AND SYSTEM FOR CONTROLLING DOWNHOLE PUMPING SYSTEMS

(71) Applicant: Magnetic Pumping Solutions, Witney (GB)

(72) Inventors: Georgios Orfanoudakis, Heraklion (GR); Michael Yuratich, Hamble (GB)

(*) Notice: Subject to any disclaimer, the term of this patent is extended or adjusted under 35 U.S.C. 154(b) by 0 days.

(21) Appl. No.: 16/982,617

(22) PCT Filed: Mar. 21, 2019

(86) PCT No.: PCT/US2019/023449
§ 371 (c)(1),
(2) Date: Sep. 21, 2020

(87) PCT Pub. No.: WO2019/183407
PCT Pub. Date: Sep. 26, 2019

(65) Prior Publication Data
US 2021/0025381 A1 Jan. 28, 2021

Related U.S. Application Data

(60) Provisional application No. 62/723,031, filed on Aug. 27, 2018, provisional application No. 62/646,128, filed on Mar. 21, 2018.

(51) Int. Cl.
*F04B 49/06* (2006.01)
*F04B 17/03* (2006.01)
(Continued)

(52) U.S. Cl.
CPC ............ *F04B 49/06* (2013.01); *E21B 43/128* (2013.01); *F04B 17/03* (2013.01); *F04B 47/06* (2013.01); *F04B 49/02* (2013.01); *H02P 3/24* (2013.01)

(58) Field of Classification Search
CPC .......... F04B 49/06; F04B 17/03; F04B 47/06; F04B 49/02; E21B 43/128; H02P 3/24
See application file for complete search history.

(56) References Cited

U.S. PATENT DOCUMENTS 2,854,613 A * 9/1958 Mowery ................... H02P 3/24
327/518
4,410,845 A * 10/1983 Lockyear .................. H02P 1/02
318/368

(Continued)

OTHER PUBLICATIONS

Wikipedia, "Braking Chopper", 2016.*

*Primary Examiner* — Christopher S Bobish
(74) *Attorney, Agent, or Firm* — Matthew J Patterson

(57) ABSTRACT

Embodiments are disclosed for the control of downhole pumping systems that can perform a controlled draining operation of the downhole pumping system in the event of an interruption of a drive. Such embodiments include a zero power factor control, a motor braking, and a pumping down operation. The apparatus and the methods disclosed can include an independent piece of equipment interlocked with a variable speed drive, and installed at the primary or secondary of the step-up transformer where used. However, integration within other pieces of equipment, in particular the variable speed drive, and its control by the latter is also contemplated. Also disclosed is a transformer having a tap changer that includes a plurality of taps and contacts including shorting contacts, open contacts and auxiliary contacts.

41 Claims, 14 Drawing Sheets

(51) Int. Cl.
  *F04B 47/06* (2006.01)
  *F04B 49/02* (2006.01)
  *E21B 43/12* (2006.01)
  *H02P 3/24* (2006.01)

(56) References Cited

U.S. PATENT DOCUMENTS

| | | | | |
|---|---|---|---|---|
| 4,926,942 A | 5/1990 | Profrock, Jr. | | |
| 5,198,734 A * | 3/1993 | Johnson | ............... | H02P 3/24 318/275 |
| 5,649,808 A | 7/1997 | Gruszecki et al. | | |
| 5,820,350 A * | 10/1998 | Mantey | ............... | E21B 43/126 417/44.1 |
| 6,039,115 A * | 3/2000 | Mills | ............... | F16D 7/044 188/82.1 |
| 6,481,973 B1 * | 11/2002 | Struthers | ............... | F04D 7/045 417/43 |
| 7,330,779 B2 * | 2/2008 | Schulz | ............... | F04C 13/008 700/282 |
| 7,534,096 B2 * | 5/2009 | Schulz | ............... | F04C 14/28 417/44.11 |
| 7,668,694 B2 * | 2/2010 | Anderson | ............... | G05D 9/12 702/182 |
| 8,092,190 B2 * | 1/2012 | Leuthen | ............... | F04D 15/0066 417/44.1 |
| 8,287,246 B2 * | 10/2012 | Plitt | ............... | F04B 47/06 318/9 |
| 8,581,531 B2 * | 11/2013 | Onuma | ............... | H02P 3/18 318/400.14 |
| 9,976,555 B2 * | 5/2018 | Cheng | ............... | E21B 43/126 |
| 10,263,561 B2 * | 4/2019 | Huh | ............... | E21B 43/128 |
| 2005/0030002 A1 | 2/2005 | Shao et al. | | |
| 2005/0109516 A1 | 5/2005 | Wilson et al. | | |
| 2008/0286131 A1 * | 11/2008 | Yuratich | ............... | H02K 5/132 417/410.1 |
| 2010/0213921 A1 | 8/2010 | Abolhassani et al. | | |
| 2011/0050145 A1 * | 3/2011 | Plitt | ............... | H02P 3/00 318/490 |
| 2012/0100014 A1 * | 4/2012 | Seitter | ............... | F04D 15/0209 417/423.3 |
| 2013/0206555 A1 | 8/2013 | Donhauser et al. | | |
| 2016/0293294 A1 | 10/2016 | Matlack et al. | | |
| 2017/0244294 A1 * | 8/2017 | Holzmueller | ............... | H02K 5/132 |
| 2018/0034446 A1 | 2/2018 | Wood | | |
| 2018/0347337 A1 * | 12/2018 | Romer | ............... | E21B 47/117 |

* cited by examiner

METHOD AND SYSTEM FOR CONTROLLING DOWNHOLE PUMPING SYSTEMS

CROSS REFERENCE TO RELATED APPLICATIONS

This application claims the benefit of U.S. Provisional Patent Application Ser. No. 62/646,128 filed 21 Mar. 2018 and U.S. Provisional Patent Application Ser. No. 62/723,031 filed 27 Aug. 2018 as well as Patent Cooperation Treaty Patent Application Serial No PCT/US2019/023449 filed 21 Mar. 2019. The disclosure of the applications above are incorporated herein by reference in their entirety.

FIELD OF THE INVENTION

The present invention relates to downhole pumping systems, safe and reliable stopping and starting thereof, and minimization of lost production when stopped, and particularly in reference to permanent magnet motor-driven pumping systems.

DESCRIPTION OF THE RELATED ART

Downhole pumping systems are a widely used method of artificial lift, whereby a pump and electric motor deployed in a borehole are used to bring fluid and gas to surface. Artificial lift is necessary when the natural well pressure is insufficient to do so by itself. The motor is powered via a length of electric cable rising to surface and thence connected to control equipment.

Referring to FIG. 1, there is shown a typical downhole pumping system installed in a wellbore. As is known, a borehole drilled in an earth formation 1 may be lined with casing 2 cemented to the surrounding formation. A motor 10 is coupled to a pump 12 via a motor seal 11 and the pump is configured to pump fluid to the surface when driven in a forward direction. The pump discharge end 13 is attached to production tubing 3. Production fluid (not shown) enters the well via perforations 4 in the casing 2 and enters the pump at its intake 14. The production tubing 3 runs up the borehole through the wellhead 6 and on to surface production facilities. In a typical installation, motor 10 comprises a three-phase motor and is powered via a three-conductor electric cable 15, which runs up to surface alongside and clamped to the production tubing 3 in a manner well known in the art. The cable 15 then penetrates through the wellhead 6 and runs to a vented junction box 20. In the embodiment shown, surface multiphase power supply 21 is converted by drive unit 22 to a frequency and scaled voltage needed by the motor 10, allowing for voltage drop in the cable. The scaled voltage is then increased to the actual voltage needed by the motor 10, by step-up transformer 23. The output of the transformer 23 is electrically coupled in the vented junction box 20 to the motor cable 15. In other embodiments, older installations for example, drive unit 22 may simply comprise a switch-board that passes the supply voltage directly to the transformer via a controllable contactor and protective fuses. In the current area of art, drive unit 22 is preferably a variable speed drive as this permits optimization of production and energy savings. A variable speed drive is in any case required for permanent magnet motors (PMMs) due to the need for synchronous control. A control unit 24, whether separate or incorporated within the drive unit 22, may be used to stop and start the motor and potentially to reverse the motor direction by switching phase connections.

Now with reference to FIG. 2 there is shown a representative drive 22 comprising an AC supply rectifier 40 of varying sophistication which charges a DC bus 41 to voltage V. The bus is also known as a DC link, as in link or bus voltage. The drive 22 includes a DC to AC inverter 42 which generates polyphase voltage at the correct frequency to drive the motor 10 (FIG. 1). Now with reference to FIG. 3, further detail of the known representative output stage of DC to AC inverter 42 (from FIG. 2) of a three-phase drive 22 is shown. Switches Q1 to Q6 in the form of insulated-gate bipolar transistors (IGBTs) each comprised of a three-terminal power semiconductor device paralleled by diodes. The electronic switches are open and closed so as to present the bus voltage across the output phases A, B, C in either polarity, or zero voltage (if three upper or three lower switches are simultaneously closed). The eight combinations of open and closed amongst the six switches Q1 to Q6 are known as switching vectors of which the two zero voltage cases are known as zero vectors. The term zero vector(s) and zero vector output are used herein to describe this electronic means of shorting the drive output terminals. In typical use, switches Q1 to Q6 are operated with successive vectors for varying periods of time so as to produce a three-phase pulse-width modulated output voltage which if low-pass filtered approximates a sine wave. There are many known modulation methods in the art, such as variants of sine wave pulse-width modulation and space vector modulation. There are other configurations of inverter stages such as cascaded and neutral clamp medium voltage inverters which use more switching devices than Q1 to Q6 but these also all have a plurality of zero vectors. The output voltage to be generated by the inverter stage is calculated over time by control methods, as will be described in more detail herein below.

A prior art method for controlling AC motors using variable speed drives is scalar control, which only adjusts the magnitude and frequency of the voltages applied to the motor. Scalar control variants typically do not require knowledge of the motor's shaft angular position and speed. For synchronous motors, in particular, these methods assume that the motor is running at the synchronous speed which is determined by the drive output frequency. Yet another method of controlling AC motors (and downhole pumping systems thereby) is vector control. As opposed to scalar control, vector control methods almost always require knowledge of the shaft angular position and speed. These methods can more accurately control the characteristics of the motor voltage and current waveforms, and hence its speed and torque.

Now with reference to FIG. 4, certain representative details of a vector control algorithm, or rotor flux oriented control, as would be understood by one skilled in the art are outlined in order to better understand the invention herein below described. Signal 2713 is the measured or estimated motor shaft angle and signal 202 is the motor speed. Transformation calculator 2704 uses the angle 2713 to convert the measured three phase drive alternating output current 2703 to approximately steady in-phase 2705 and quadrature 2706 currents in the reference frame rotating with the motor rotor. The frame is fixed in the rotor such that its d-axis is aligned with a rotor pole and its q-axis is displaced 90 electrical degrees. Known proportional-integral (PI) controller 2707 compares in-phase current 2705 with a predetermined reference level $i_{dref}$ 2701, and generates an in-phase voltage demand 2708 needed to correct and difference in these currents. Similarly, a quadrature voltage demand 2710 is output by PI controller 2709 in response to the difference between quadrature current 2706 and a predetermined reference current $i_{qref}$ 2702. The voltage demands are transformed by calculator 2711 back into actual three-phase voltage references 2712. The inverter 42 (FIGS. 2, 8) is then controlled to output these voltages to the motor. As is known, the predetermined reference current $i_{qref}$ 2706 sets the motor torque, and the predetermined reference current $i_{dref}$ 2701 is normally set to zero as it does not produce useful torque. Transformation calculator 2704 embodies the known Clarke and Park transformations and transformation calculator 2711 embodies their known inverses. In operation is it common to use an additional PI controller 200 to compare the motor speed 202 with a predetermined motor speed reference 201, said controller then outputting the required reference current 2702 and varying it so that the speed is held sensibly constant.

It is known that shaft angular position and speed can be obtained from on-motor shaft sensors. This can be costly and reduce reliability and, for downhole motors in particular, be impractical. Thus, many vector control drives use sensorless control techniques and not a physical shaft sensor. Sensorless control is typically a computational process variously known as an observer or estimator comprising, in part, some form of phase locked loop, which uses the drive's own measurements of its voltage and current outputs in conjunction with an electrical model of the connected motor system, and in the case of submersible pump applications, the electrical model can include the connecting cable 15 and intermediate transformer 23 of FIG. 1. There exists a large collection of sensorless control methods in prior art literature.

Observers of the prior art typically operate satisfactorily above a certain minimum (in absolute terms) motor speed. Above that speed, the shaft position-speed information they produce can be used to perform vector control on the motor. This mode of operation is referred to in the art as "closed-loop control", since the voltage and current outputs of the drive are used by the observer, which in turn feeds its shaft speed and position estimates to the vector control algorithm, which determines the drive output to the motor. At very low speeds, as compared to the nominal speed of the application, however, the observer outputs can contain significant errors and therefore many implementations of vector control do not use the observer outputs in this speed range. Instead, they use pre-defined values of speed, which can be fixed or ramped towards a given direction. The angle of the shaft is calculated as the integral of the above referenced speed. In this mode of control, the motor is assumed to follow the pre-defined speed and angle. As used in the art, this is referred to as "open-loop control", since the drive output voltage-current information is not fed back to the controller through the operation of the observer. If the motor shaft does not actually follow the pre-defined speed and angle, the motor will not operate correctly. It may, for example, stall, exhibit rapidly reversing torque, or be driven by a rotating load.

Referring to FIG. 5, there is shown a typical control curve for a PMM 10 using a sensorless drive 22 wherein control curve 35 is indicative of the speed of the motor shaft versus time. During the start-up period 36 drive 22 operates in the aforementioned open loop mode in accordance with predetermined values of winding voltage and/or current to motor 10. Once motor 10 achieves enough speed, the aforementioned observer is able to produce shaft angle and speed estimates using the voltage and current outputs as data, and drive 22 begins closed-loop vector control. The motor speed now relatively quickly changes 37 until it settles at its predetermined speed 38 and is maintained at this value by the controller. In some applications a predetermined current is used instead of speed and in other applications an additional control is used to adjust speed or current to maintain some other quantity at a predetermined value, such as constant fluid pressure at the pump intake.

Electric motors can drive many types of rotating machinery. Such rotating machinery can include pumps, and centrifugal pumps of the prior art are commonly used in downhole pumping systems as well as progressive cavity pumps (PCPs). Historically ESP as a category of artificial lift referred exclusively to induction motor driven centrifugal pumps. Newer downhole pumping systems employ a PMM to drive the pump. As used herein, ESPs will for convenience refer to motor driven centrifugal pumps rather than the entire field of electric submersible pumps, wherein the motor includes permanent magnet motors.

ESPs, or centrifugal pumps, are from the family of hydrodynamic pumps including such known types as radial flow, mixed flow, axial flow and helico-axial flow which generally operate at speeds of thousands of revolutions per minute and obey the known affinity laws which relate shaft speed to torque and fluid head. They are made in multiple stages, often more than one hundred, and have a relatively open path to fluid throughout their length.

PCPs of the prior art are a type of positive-displacement pump, typically operating in the low hundreds of revolutions per minute. A steel rotor is almost always in rubbing contact with an elastomer stator such that a series of essentially sealed travelling cavities are formed along the length of the rotor-stator interface. The rubbing contact is associated with relative low leakage and significant rubbing friction. The friction at the moment of starting is static friction and can be several times higher than the dynamic friction when running normally. The shaft torque needed to overcome static friction is commonly referred to as breakout torque.

As will be discussed in more detail hereinafter, there are circumstances where pump and rotor of motor 10 may be rotating (in either direction) without the inverter of drive 22 being activated. If the motor is of permanent magnet type, it generates a voltage when rotating, that is it operates as a generator. It should be appreciated that if it is spinning at a sufficiently high rate the magnitude of the generated voltage can be high enough that, among other things, the drive 22 will be damaged. When a pump 12 is operating in a well, it is boosting the well inflow pressure to the pressure needed to lift the fluid to surface. The motor 10 power is principally used to lift the fluid. When motor 10 is stopped, whether deliberately or by a power-cut or other type of failure, the fluid column in the production tubing 3 above is no longer supported by the pump lift, and the fluid weight will provide a force to drain the fluid column back through the pump 12. Some of this force will usually be sufficient to drive the pump 12 and attached motor 10 in the opposite, or reverse, direction to the normal, or forward, direction. This is commonly known as backspin. The actual force driving the pump is the head, or differential pressure across the pump, i.e. the difference between discharge pressure and intake pressure. Typically, the intake pressure will be rising as the discharge pressure falls, and back spin will stop when their difference is small, not that the absolute discharge pressure is small. The characteristics of backspin will vary between the type and installation of any particular downhole pumping system and many of such characteristics are well understood.

PCPs act equally effectively as hydraulic motors when driven by fluid, compared to normal operation as a pump driven by the shaft rotation. Provided that the fluid weight in the production tubing 3 in FIG. 1 is sufficient to overcome the pump friction described herein above, it will drive the PCP type pump in reverse as a hydraulic motor. When the electric motor experiences an occurrence of supply power interruption, and taking into account the low inertia of pump and motor rotors, the electric motor and pump could be rapidly accelerated to very high reverse speed. For example, in a typical installation, and without countermeasures, a pump 12 can change from a typical 200 rpm forward speed while pumping to −2000 rpm reverse speed while motoring in a fraction of a second (i.e. within one or a few shaft rotations). Among other deleterious effects, this can severely damage the pump 12. Moreover, if the motor 10 is a PMM type motor (usually selected due to its excellent torque characteristics), when driven mechanically it becomes an electrical power generator. If the motor voltage in the above example at typical forward speed of 200 rpm is 400V, then the backspin could potentially generate 4000V, which is likely to destroy the surface variable speed drive 22 and damage motor 10, cable 15 and well-head cable penetrator insulation (not shown).

The fluid weight will also drive a centrifugal pump (ESP) in a backward directional rotation, also referred to herein as backspin. Once the direction reverses, since a centrifugal type pump is not efficient as a PCP in reverse, the backspin speed will be lower or on the same order as the forward speed, but not many times higher as is the case for the PCP type pump. For the majority of traditional wells of a few thousand feet in depth, no damage to the pumping system usually occurs due directly to ESP backspin. However, particularly with deep wells (typically 10000 ft or more vertically) used in unconventional or extreme applications, the backspin speed may be sufficiently higher than the forward speed to result in a PMM generator voltage that is then sufficient to destroy the surface variable speed drive 22 and in some cases the motor 10, cable and wellhead 6 cable penetrator insulation (not shown).

In situations of power loss where electrical and mechanical overspeed damage is not the immediate problem, further difficulties may arise in such prior art pumping systems. Some pumps may have a bearing configuration that is easily damaged when back-spinning. Of critical importance, if the backspin is not detected or reported, the PMM-generated voltage appearing at surface may constitute a safety hazard. Unsuspecting personnel may open junction box 20, or other electrical devices located at the surface, for troubleshooting without realizing that lethal voltage is present. It is important to note that a 3600 rpm/3600V rated PMM will typically generate about 48V at only 60 rpm. Under current international electrical safety standards, 48V is considered the maximum safe electrical voltage, and it can be seen that this may be attained at extremely low speeds in electric submersible pumping systems in the art. Moreover, if backspin is not detected, there is the possibility of prematurely attempting a restart in the normal (forward) direction resulting in shaft breakage and further electrical issues.

Additionally, wells are subject to events known as well-kicks where a sudden influx of liquid and gas is released into the well. When the motor 10 is stopped, such an influx appearing at the pump intake can unexpectedly force the pump to turn in its normal direction, and again hazardous voltage may be generated and appear at surface. Other unexpected circumstances can arise, such as injection into the well when a surface valve is accidentally left open to other flowlines. The back pressure from the surface can cause a stopped pump 12 to start back-spinning in this case and driving motor 10 thereby.

It is also important to note that a backspin condition can last for hours. Prolonged back-spinning is undesirable as it results in lost production between restarts and a period of reduced production while the well re-stabilizes after a restart. Therefore, reducing backspin time is highly desirable.

Prior art methods to control backspin include a known check valve (not shown) that may be installed in the production tubing 3 above the pump 12. The check valve is intended to stop the fluid column from descending within the tubing and eliminate backspin thereby. A further advantage to using such a check valve is that the pump 12 may be restarted immediately after stopping. Disadvantages to using such a check valve are reduced reliability and the possibility for sand and debris dispersed in the tubing 3 when lifting fluid to settle out and block the tubing. A particular disadvantage arises when a PCP type pump is prevented from back-spinning by using such a check valve. When it comes to restarting the PCP, the breakout torque is significant and it must be overcome, in addition to the torque needed to resume lifting of the supported fluid column. In practical applications, this combination of breakout torque and opening the check valve can more than double the required starting torque, and in turn require double the motor size and cost. In many cases this renders the installation of such PCPs uneconomic.

Other prior art methods for controlling backspin include the use of a known reverse bypass valve (not shown) installed in tubing 3 above pump 12. The use of a reverse bypass valve ensures continuity of the tubing in normal pumping, but in reverse flow from a descending fluid column it opens the tubing to the casing annulus. The fluid column and entrained sand within the tubing 3 discharges back into the well. Operating in this way, the fluid column drains rapidly, permitting the drive to be configured to command a restarting of the motor 10 without the burden of the fluid column. In the case of PCPs, the motor size selected will typically be the same, or only slightly larger, than that which is needed for lifting the fluid to the surface, in order to ensure it will overcome the breakout torque alone. The disadvantages of the use of a reverse bypass valve are its cost, reduced reliability and the discharge of sand and debris from the tubing back into the casing annulus near the pump intake. The sand and debris fall within the column and can cause pump and flow blockage, particularly in unconventional wells where large quantities of loose fracking material are left in the well and/or re-enter the well from the fractured formation during lifting operations.

In conventional induction motor driven downhole pumping systems, unlike in a PMM driven pumping system, an induction motor does not act as a primary generator when driven in the opposite direction. Therefore, there exists no major electrical hazard as such, but there remains the aforementioned risk of restarting the pump before the column of fluid has drained and backspin has finished. It is known in the art to use backspin relays to detect low-level parasitic generator voltage arising from weak remnant ferromagnetism in the rotors. However, these relays are not useful in addressing the high voltage backspin issues of PMMs.

As discussed herein above, a common cause of pump stoppage is a failure of the supply of power to drive 22. This loss of supply of power can be because of generator breakdown or network issues in remote locations. Back-spinning must be managed in these cases, preferably without using uninterruptible power supplies and complex controls which themselves may fail. Techniques which are usable in general industry, such as absorbing power from a PMM to slow it down and returning the energy to the supply, will not work with generators or with disconnected network power.

A known prior art method of absorbing energy from a spinning load, and widely available as a feature of industrial variable speed drives, is the use of a brake chopper module. Referring to FIG. 2 there is shown a typical brake chopper module 43 attached to the bus 41. The nature of the inverter 42 shown is such that when not actively driving the output, i.e. with the switches all turned off, the diodes paralleling each IGBT act as a rectifier to the voltage presented by a back-spinning PMM. If the backspin voltage when rectified would exceed the normal bus voltage resulting from rectifying the supply voltage, then it will charge the bus 41 to a higher voltage. When the bus voltage increases to a level above the normal working maximum, the brake chopper module 43 will connect a resistor 44, known as a brake resistor, across the bus, to absorb energy from the load. A correctly sized brake resistor 44 will absorb sufficient energy from the load to limit the backspin speed and stabilize the bus voltage to a high, but acceptable, voltage. In safety terms, there is still hazardous voltage on all the external connections from drive 22 to wellhead 6 (FIG. 1). For this method to be effective, the control circuitry in chopper module 43 must be powered to be active. In the case of a supply power failure, module 43 must either be self-powered from the rectified backspin voltage, or have an independent power supply. In such cases, the backspin speed must be high enough to charge the bus voltage to a level where the brake chopper 43 activates. However, when operating normally, the voltage output of the variable speed drive 22 is higher than the internal generator voltage of the motor (also known as back EMF), taking into account the ratio of any step-up transformer 23, in order that it overcomes the impedance (resistance and reactance) of the cable 15 and of the motor 10. When the motor 10 is back-spinning, the drive 22 will see only lower internal generator voltage, for the same absolute speed of backspin as normal running speed, since there is no or low current to cause a voltage drop in the cable and motor impedance. This voltage drop is particularly significant in the case of PCPs. As a result, the backspin speed may have to be very high before the voltage increases to a level where the brake chopper module will activate, defeating its intended purpose of protecting the pump from excessive speed.

The brake chopper module 43 attached to drive 22 is used as an illustration, but it will be appreciated by those practiced in the art that a module can be made in other ways, including by attachment via a separate three-phase rectifier directly to the motor phases outside the drive, thereby creating a local bus from which energy can be absorbed.

Now referring to FIG. 6, there is shown a graphical representation of the operation of an ESP and PMM installation using a drive 22 and chopper module 43 of the prior art (or other energy absorbing means such as regeneration to the supply) to control the backspin rotation of a pumping system. Drive bus voltage (41 in FIG. 2) is depicted by upper curve 60 and motor speed is depicted by lower curve 61 against the y-axis versus time along the x-axis. The drive bus voltage 60 and motor speed 61 are initially at their normal predetermined values as controlled by drive 22. When the power from the drive is stopped, shown as point 62, the motor speed 61 first drops rapidly to zero then reverses rotational direction, due to the fluid column weight above the pump. When the reverse speed exceeds the level needed for the PMM generator voltage to charge the bus, the bus voltage 60 rises. If the voltage exceeds a predefined threshold, the brake chopper module 43 (FIG. 2) starts operating shown as point 63, stabilizing the bus voltage and loading the motor by absorbing power from it as hereinbefore described. For an ESP the torque needed to slow the pump, and the power of absorption of the braking resistor, is relatively small as such a pump is inefficient in reverse. The backspin speed then gradually reduces as the fluid column drains, until it no longer charges the bus to the level at which the chopper module operates shown as point 64. The fluid column drains passively until equilibrium is sensibly reached (head=0) and a zero speed is reached shown as point 65. It is important to note that PMM 10 will generate voltage until equilibrium is reached and this voltage will be transmitted back to drive 22.

Now with reference to FIG. 7, there is shown a graphical representation of the operation of PCP and PMM installation using a drive 22 and brake chopper module 43 of the prior art to control the backspin rotational direction of a pumping system after power from the drive is stopped. It is important to note that unlike the use of a brake chopper module 43 with an ESP and PMM, the brake chopper module with a PCP and PMM may not be able to prevent damage as the backspin speed of the pump necessary to activate the brake chopper module may be too high. For the purposes of the present example it will be assumed that the brake chopper module 43 reacts quickly enough and has a brake resistor 44 of sufficient power rating that the speed can be safely limited. As described herein before with reference to FIG. 6, the DC bus voltage depicted by upper curve 60 and motor speed depicted by lower curve 61 are initially at their normal predetermined values as controlled by drive 22. After power from the drive stops flowing depicted by point 62, the pump 10 rapidly reverses rotational direction as it is driven by the descending fluid column, and quickly reaches a high negative speed. It is important to note that the backspin speed will remain high until the fluid column can no longer overcome friction, and hence the brake chopper module operation will be prolonged for sensibly all the backspin time as depicted by the dashed portion of line 60 between points 63 and 64. The backspin speed then gradually reduces as the fluid column drains, until it no longer charges the bus to the level at which the chopper module operates shown as point 64. After the brake chopper module is released the fluid column drains passively until equilibrium between head and pump friction is reached at a zero speed shown as point 65. As in the example cited directly above relative to ESPs, PMM 10 will generate voltage until equilibrium is reached and this voltage will be transmitted back to drive 22.

Some prior art pumping systems include surface drive equipment where components such as the motor drive, motor, gear reducer and drive are mounted on the surface and drive a pump mounted in the well through a rod string. Such surface drive equipment also experiences power interruptions have their own set of problems associated with the interruption of power. It is known in such systems to install a switch between the drive and the motor to divert power from a backspinning permanent magnet motor to a dissipative load. The dissipative load absorbs the power and slows the motor. One such solution is set forth in U.S. Pat. No. 7,880,410, the entirety of which is disclosed herein in its entirety.

For clarity of explanations, the examples described with reference to FIGS. 6, 7 assume that when the drive 22 stops it is configured so that its DC bus 60 is no longer charged from the multiphase power supply 21, and hence the DC-bus voltage will eventually reduce to zero when the motor stops. This would be also the case if there is a power supply failure.

However, some prior art drives may continue to charge the bus if there is no loss of supply, and the bus voltage will according eventually return to its normal voltage when the pump has stopped. It will readily be appreciated that this does not affect the behavior of pump and motor since the drive 22 is stopped.

For at least the reasons stated herein before, it is desirable to control pump backspin in a safe and reliable manner especially in cases of failure of the supply power. There is clearly a need for an improved means of detecting reverse rotation of pump and motor, acting on it promptly and reducing stoppage time and facilitating restart.

SUMMARY OF THE INVENTION

In accordance with some aspects of the present disclosure, systems and methods related to controlling a motor driven system are disclosed.

One or more computer programs can be configured to perform particular operations or actions by virtue of including instructions that, when executed by data processing apparatus, cause the apparatus to perform the actions. One general aspect includes a downhole pumping system connected to a supply power including: a multiphase motor coupled to a pump having a forward direction and a backspin direction, a motor drive configured to be electrically coupled to the supply power and the multiphase motor, and a system control module electrically coupled to the motor drive and to the multiphase motor and configured to determine an occurrence of an interruption of the motor drive and configured to control a rotational aspect of the multiphase motor. Other embodiments of this aspect include corresponding computer systems, apparatus, and computer programs recorded on one or more computer storage devices, each configured to perform the actions of the methods.

Implementations may include one or more of the following features. The downhole pumping system where the motor drive and the system control module are configured to apply a braking force to control the rotational aspect of the multiphase motor. The downhole pumping system where the system control module is a braking short configured to short at least two phases of the multiphase motor to apply the braking force. The downhole pumping system where the system control module is a brake chopper configured to apply the braking force. The downhole pumping system where the system control module is a switch electrically connected to the motor drive and selectively electrically connected to the multiphase motor and configured to short at least two phases of the multiphase motor to apply the braking force. The downhole pumping system further including a transformer electrically coupled to the multiphase motor, the transformer including a tap changer having a plurality of taps and where the system control module is included of a first tap of the plurality of taps configured to short at least two phases of the multiphase motor. The downhole pumping system where the rotational aspect of the multiphase motor is a backspin speed of the multiphase motor. The downhole pumping system further including the downhole pumping system configured to monitor a plurality of parameters related to the multiphase motor. The downhole pumping system where the motor drive is configured to apply a zero vector output to the multiphase motor for a predetermined period of time to apply a drive controlled braking force to the multiphase motor to control the rotational aspect of the multiphase motor.

One general aspect includes a system for controlling an operation of a downhole pumping system including a pump, where the pump is driven by a polyphase downhole permanent magnet motor having a drive, the system including: a system monitor configured to detect a plurality of parameters related to the downhole pumping system and to output at least one output signal indicative of at least one of the plurality of parameters. The system also includes at least one braking module configured to apply a braking force to the polyphase downhole permanent magnet motor in response to the at least one output signal indicative of an interruption of the drive and a backspin rotational direction of the polyphase downhole permanent magnet motor.

Implementations may include one or more of the following features. The system where the at least one braking module includes a shorting relay configured to short at least two phases of the polyphase downhole permanent magnet motor. The system further including a transformer electrically coupled to the polyphase downhole permanent magnet motor, the transformer including a tap changer having a plurality of taps and where the at least one braking module is included of a first tap of the plurality of the taps configured to short at least two phases of the polyphase downhole permanent magnet motor. The system where the at least one braking module is included of a switch electrically coupled to the polyphase downhole permanent magnet motor and configured to short at least two phases of the polyphase downhole permanent magnet motor. The system further including a bus electrically coupled to the drive and where the at least one braking module is included of a brake chopper module electrically coupled to the bus. The system further including the drive configured to apply a zero vector output to the polyphase downhole permanent magnet motor for a predetermined period of time to apply a drive controlled braking force to the polyphase downhole permanent magnet motor. The system where the at least one braking module is configured to release the braking force to the polyphase downhole permanent magnet motor in response to the at least one output signal indicative of any of a resumption of the drive and a predetermined minimum backspin speed. The system where the drive is configured to command the polyphase downhole permanent magnet motor to run in a forward pumping direction in response to an output signal indicative of an acceptable restart condition. The system where the pump is one of an ESP or a PCP type pump. The system where the drive is a sensorless drive. The system further including the pump configured to pump a column of fluid in a forward pumping direction and where the at least a portion of the column of fluid is drained by driving the pump in the backspin rotational direction.

One general aspect includes a method for controlling an operation of a downhole pumping system including a pump, where the pump is driven by a motor having a motor drive; said method including: determining an occurrence of an interruption of the motor drive; determining a rotational condition of the motor; and performing a controlled draining operation of the downhole pumping system; and where the controlled draining operation is any of a zero power factor control, a zero vector output, a motor braking, and a pumping down operation. Other embodiments of this aspect include corresponding computer systems, apparatus, and computer programs recorded on one or more computer storage devices, each configured to perform the actions of the methods.

The method where the rotational condition of the motor is any of a forward rotational direction, a backward rotational direction or a stopped rotation. The method further including monitoring a plurality of parameters related to the motor. The method further including determining a maximum backspin speed of the motor and determining a minimum backspin speed of the motor. The method where the controlled draining operation includes applying the zero power factor control. The method further including determining a resumption of the motor drive and where the controlled draining operation includes the pumping down operation and driving the motor in the backward rotational direction. The method where the controlled draining includes applying a motor braking and where applying the motor braking includes any of operating a shorting relay, operating a tap changer, operating a switch, operating a chopper, operating a resistive and operating a capacitive load. The method further including establishing a delay period and applying the motor braking after the delay period. The method where operating the shorting relay includes operating the shorting relay to short at least two phases of the motor. The method where the zero vector output includes configuring a plurality of electronic switches to apply a zero vector output to the motor. The method further including injecting a predefined value of dc current into the motor and providing the stopped rotation. The method where the backward rotational direction of the motor produces a back emf to power the motor drive. The method further including driving the motor in the forward direction after the controlled draining operation. The method where the pumping system further includes a column of fluid positioned above the pump and where the column of fluid includes sand and where performing the controlled draining occurs at a rate sufficient to prevent the sand from blocking the pump.

One general aspect includes a transformer coupled to a multiphase power supply, the transformer including: a multiphase primary winding connected to the multiphase power supply; a first secondary coil including a plurality of first output taps and in electrical transfer arrangement with the primary winding; a first shorting contact; and a first moveable contact switch configured to be electrically coupled to an electric machine and selectively operable to be electrically connected with any of the first plurality of output taps and the first shorting contact; a second secondary coil including a plurality of second output taps and in electrical transfer arrangement with the primary winding; a second shorting contact; and a second moveable contact switch configured to be electrically coupled to an electric machine and selectively operable to be electrically connected with any of the second plurality of output taps and the second shorting contact; a third secondary coil including a plurality of third output taps and in electrical transfer arrangement with the primary winding; a third shorting contact; and a third moveable contact switch configured to be electrically coupled to an electric machine and selectively operable to be electrically connected with any of the third plurality of output taps and the third shorting contact.

Implementations may include one or more of the following features. The transformer further including the first shorting contact, the second shorting contact and the third shorting contact electrically connected. The transformer further including the transformer configured to position at least two of the first moveable contact switch is electrically connected to the first shorting contact, the second moveable contact switch is electrically connected to the second shorting contact and the third moveable contact switch is electrically connected to the third shorting contact. The transformer may also include where the electric machine is electrically shorted. The transformer further including any of the first shorting contact, the second shorting contact and the third shorting contact are configured to be electrically connected a ground. The transformer further including: the first secondary coil including a first open contact; the second secondary coil including a second open contact; the third secondary coil including a third open contact; the first moveable contact switch electrically connected to the first open contact, the second moveable contact switch electrically connected to the second open contact and the third moveable contact switch electrically connected to the third open contact; and where the electric machine is electrically isolated from the multiphase primary winding.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure. Embodiments of the present disclosure address the many issues raised hereinbefore using a novel systematic electrical method and apparatus. The various component parts and methods of embodiments presented herein can be used in alone or in countless combinations while remaining within the scope of the disclosure.

Figure 8:
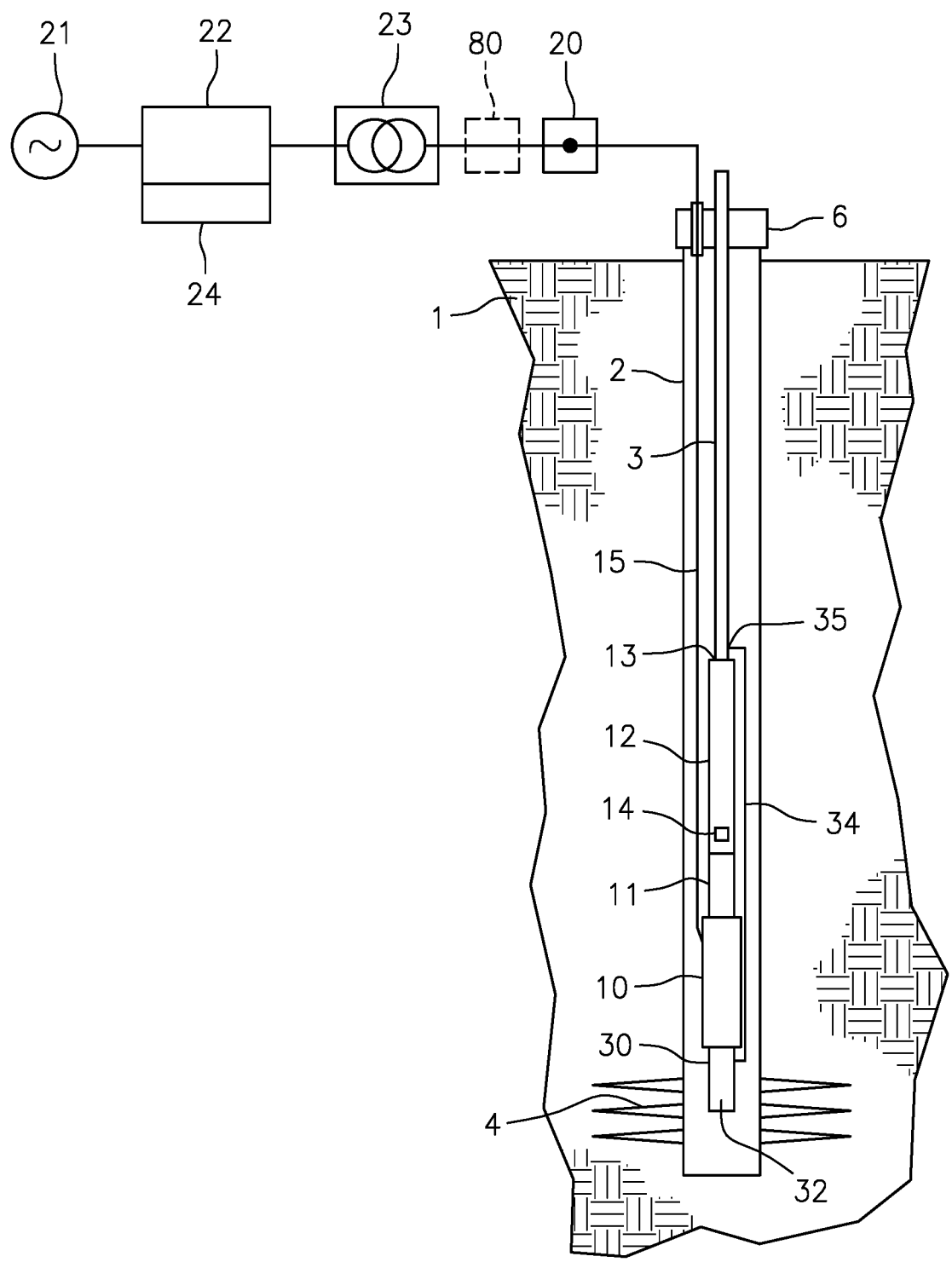
FIG. 8 is a schematic representation of a downhole pumping system in accordance with certain embodiments of the present invention.
Figure 9:
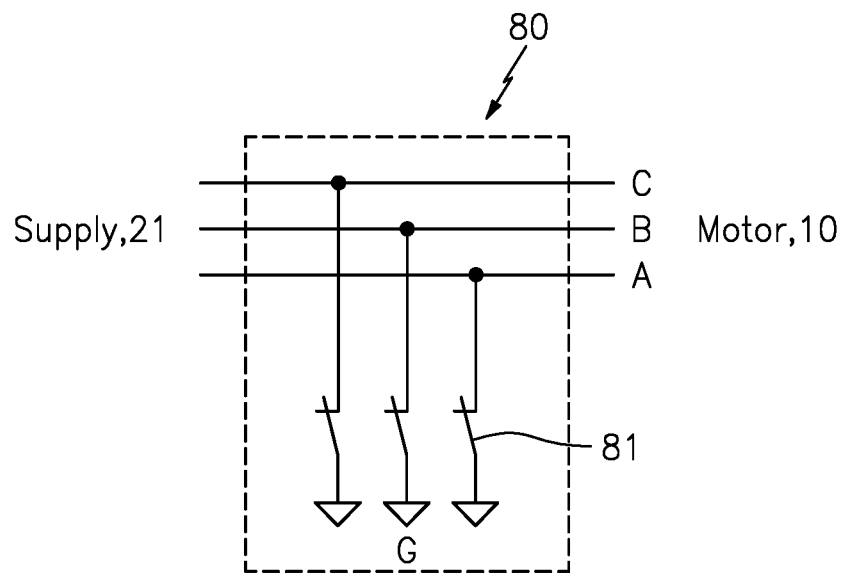
FIG. 9 is a schematic representation of a method of reducing the surface voltage to a safe level while apply braking torque.

Referring to FIG. 8, system control module 80 is shown connected to the conductors of cable 15 that are in turn connected to the various phases of motor 10. Although system control module 80 is placed within the downhole pumping system as shown, it will become apparent by the description that follows that the system control module may be placed elsewhere between multiphase power supply 21 and motor 10 without departing from the scope of the present invention. An embodiment of system control module 80 is best described with reference to FIG. 9. System control module 80 is shown with three motor phases at A, B, C, respectively couple to the phases of multiphase motor 10, and switchably connected to ground G via normally closed relay 81. As described herein before, motor 10 can comprise a multiphase, or polyphase downhole permanent magnet motor. When there is no surface power from multiphase power supply 21, or by control means to be described herein below, the circuit of system control module 80 will short-circuit the motor terminals A, B, C and ground them. As will be described herein below system control module 80 applies the braking short to control motor 10. In addition to providing backspin control as will be more fully described herein after, with the motor terminals grounded there will be no voltage at surface. It is an aspect of the invention that system control module 80 provides the desired safety function to protect personnel and equipment from hazardous voltage even when there is no power supply or backspin warning indicator.

For clarity of explanation the present disclosure emphasizes backspin, but one skilled in the art will readily appreciate that for example the shorting relay also protects against well-kicks and other circumstances that can cause the pump 12 and motor 10 to turn unexpectedly and produce hazardous voltage.

The relays 81 of system control module 80 are preferably of electromechanical type, operated by a coil or coils (not shown). Electronic devices such as solid state relays are contemplated within the present disclosure but are not as desirable as they require control circuitry to function at all times and cannot usually be relied upon for safety.

Figure 10:
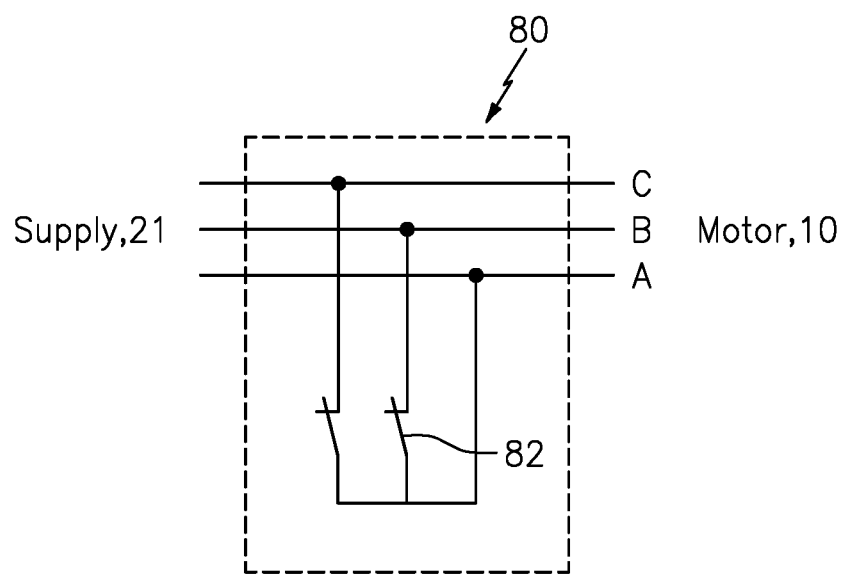
FIG. 10 is a schematic representation of method of reducing the surface voltage to a safe level while apply braking torque.

Alternative embodiments of system control module 80 are contemplated within the present disclosure including system control module shown in FIG. 10. In the embodiment shown the shorting of phases A-B and A-C is sufficient both to provide backspin control and to eliminate voltage produced by a back-spinning motor 10 through the use of shorting relay configuration 82 comprising only two relays. Although not shown, a further aspect of the embodiment of shorting relay configuration 82 shown, there is contemplated the further measure of shorting to ground; as may be provided with another relay from A to ground if desired, for example for safety reasons. A single shorting relay across a pair of phases will provide a degree of backspin protection, but will not eliminate all voltage at surface. In addition to, or as an alternative embodiment, a capacitive load could be used in series with the shorting relay (or switch) to conduct current from motor 10. The capacitor transfers only reactive power, that is, it has zero power factor. However, the current would cause the cable and motor winding resistances to dissipate power and so brake the motor. Compared to a short circuit there would disadvantageously be a voltage across the surface connections, but the initial braking speed would be higher, which can be advantageous for ESPs, and there is no dissipation in the capacitive load. It will be apparent that other loads, including resistors can be used to created different loading characteristics. In a drive using a known sine filter the filter capacitor value can be designed to provide a permanent load to help limit the maximum ESP backspin speed. It is therefore within the scope of the present disclosure to include the operation of a capacitive load and a resistive load or combinations thereof.

The known basic per phase electrical model of a PMM as a generator comprises a generator voltage that is proportional to motor speed (electromotive force, EMF) in series with the winding resistance and inductance of the motor. The total system resistance and inductance should be augmented with the series cable resistance and inductance, as they are usually significant in the long cables used in downhole pumping. In embodiments of the present invention, including system control module 80, when the phases are shorted together by the relays, as in the absence of surface supply power, the backspinning PMM generator voltage will drive current through the short-circuit via its phase conductors. This current will cause braking torque in motor 10 and may be calculated by one skilled in the art from circuit principles and motor parameters, including a rotational condition of the motor. It is an aspect of the present invention that the power produced by the generator turning against torque will be absorbed in the electrical resistance of the motor windings and the cable conductors. It is possible to include further resistance in series with the relays, but this does not affect the maximum braking torque, while adding the risk of hazardous voltage presented across them.

When the drive 22 is stopped, as in the absence of surface supply power, the weight of the descending fluid column in tubing 3 results in pump output torque at the back-spinning shaft of motor 10. The motor input torque needed to turn the short-circuited PMM and cable as a function of absolute speed (ie regardless of rotational direction) is representatively shown as line 50 in FIG. 11. Certain embodiments of present disclosure prevent motor 10 from accelerating to ever higher speed above the maximum backspin speed, holding the speed at the point where the pump output torque equals the motor input torque. By way of illustration, points 51, 52 in FIG. 11 indicate the speeds at which the backspin can be controlled for the indicated level of torque 53. In such an example, provided the system control module 80 is applied before the speed exceeds the torque-speed point 51, backspin speed will be controlled at a predetermined backspin speed.

It has been discovered that the application of the present invention requires selection of a motor 10 such that system control module 80 will provide the braking capable to meet the requirement to stabilize at a safe speed. The peak braking torque that system control module 80 could provide is typically 70% to 80% of the motor rated torque needed for normal operation. If more than this braking torque is required then the motor size must be increased.

In embodiments where transformer 23 (FIG. 8) is used, system control module 80 can also be positioned at the primary side, i.e. the side connected to drive 22. This may be desired in order to avoid the use of relays rated above, as an example, 1000V. It will be appreciated that if a transformer 23 is used between the motor and the relays in FIG. 9, 10, the circuit can be further analyzed by one skilled in the art using known electrical circuit principles. As discussed herein above, system control module 80 can also be incorporated within the drive 22 itself if desired, with or without transformer 23 being used.

A primary advantage of system control module 80 is that upon any drive stoppage, such as after a power failure, it will reliably come into effect, making the surface phase voltages safe by reducing them to zero. Moreover, it advantageously does not require a brake chopper module 43 (FIG. 2) or access to the internals of a variable speed drive 22. As described herein before, a brake chopper apparatus is generally bulky and expensive and does not reduce the surface phase voltages generated by a back-spinning motor to a safe level when power is lost.

Figure 12:
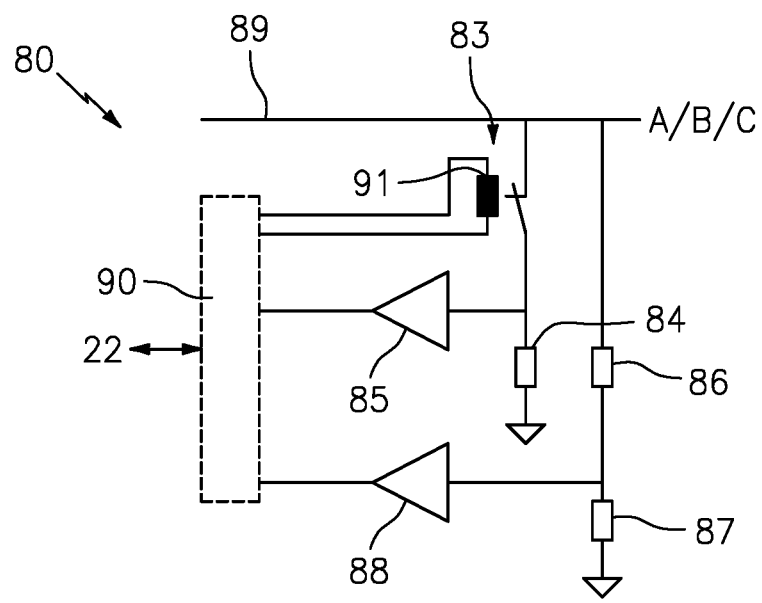
FIG. 12 is an electrical schematic of a control module in accordance with certain embodiments of the present disclosure.

Referring now to FIG. 12, there is shown an electrical circuit of an embodiment of system control module 80 for one single phase 89 (A, B or C), it being understood that the other phases are similar. Shorting relay 83 is shown with its operating coil 91 connected through interface unit 90 to the controller 22 of the present invention which will be more fully described hereinbelow. Current sensing resistor 84 is shown in series with the relay 83, on the grounded side. When braking current is flowing through relay 83, it results in a voltage across current sensing resistor 84, which is showed being conditioned by circuit 85, which circuit can comprise an amplifier. Current sensing resistor 84 may advantageously be made of metallic known resistance material and preferably has a small resistance value, perhaps 10 milliohms. A representative braking current of 50A would result in an easily detectable/measured 0.5V. In the embodiment shown, the measured voltage is relative to ground and is completely safe, and the resistor is mechanically robust, so that the protective aspects of the apparatus are not compromised. Other known current sensors, such as a hall-sensor type (as available, for example, from www.lem.com) can also be used. Such closed loop hall effect current sensors are non-contact devices and may be placed anywhere in the circuit between motor 10 and shorting relay 83 to monitor the current of phase 89. As hereinbefore described, it should be noted there are circumstances where the backspin speed of motor 10 could be very low yet result in hazardous generator voltage at frequency on the order of 1 Hz. It is therefore important to have an accurate ability to sense the current because the relay 83 should not be opened in these circumstances. It is important to be able to detect the low frequency current as set forth herein above, and prior art current measuring transformer sensors widely used for low cost and everyday monitoring in the oil field are not suitable.

Still referring to FIG. 12, resistors 86 and 87 form a potential divider conditioned by unit 88 such as an amplifier, to produce a scaled measurement of phase voltage relative to ground. By use of similar circuitry on the other two phases, the phase to phase voltage can be measured by subtraction, such as with a differential amplifier. Using well-known techniques, such as high impedance and redundant parts, it will be appreciated by those skilled in the art that such a divider results in safe measurement. The voltage can be used for monitoring system voltage whenever voltage is present. Prior art systems typically require expensive hand-held high voltage equipment exposing operators to potentially hazardous conditions. This measurement of phase voltage can provide important information in normal operation such as the speed of the pump as will be discussed more fully herein below.

Referring to FIG. 12, interface unit 90 can provide field-accessible monitoring points and indicators for current and voltage measurement, and the capability of producing output signals and communications such as Bluetooth for signaling the measurements to a personal smartphone, and the interface to the control of the present invention described herein below. As will readily be appreciated, the control may be integrated into the system control module 80, or in the drive control unit 24 (FIG. 8) or within the drive 22 itself, amongst other possibilities without departing from the scope of the present invention. In addition, system control module 80 can comprise a standalone module or can be incorporated into the drive 22.

Figure 3:
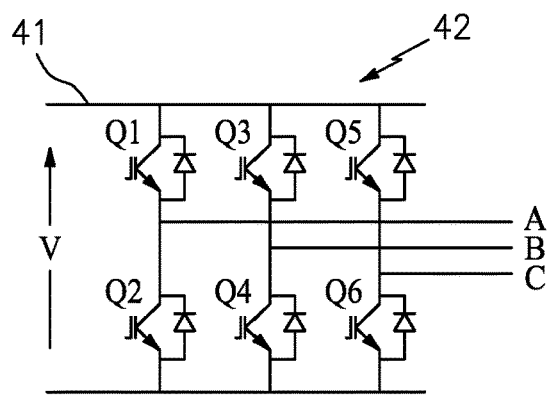
FIG. 3 is a schematic representation of an electrical diagram of an inverter drive power output stage of the prior art.
Figure 6:
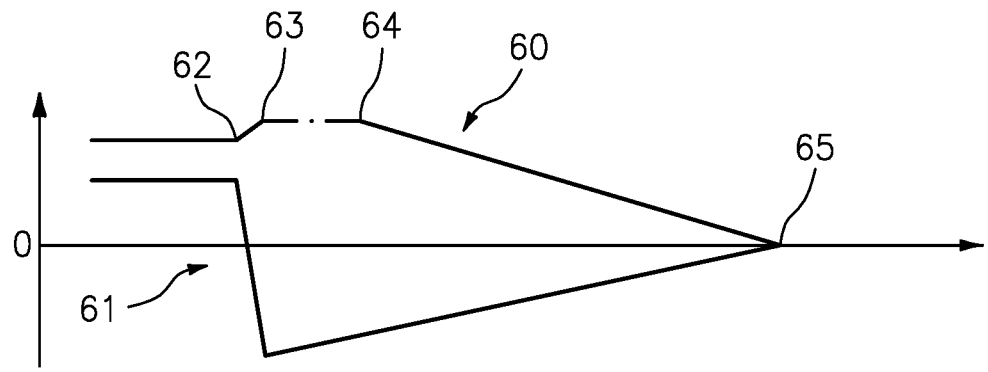
FIG. 6 is a graphical representation a method of controlling the backspin of a downhole pumping system of the prior art.
Figure 7:
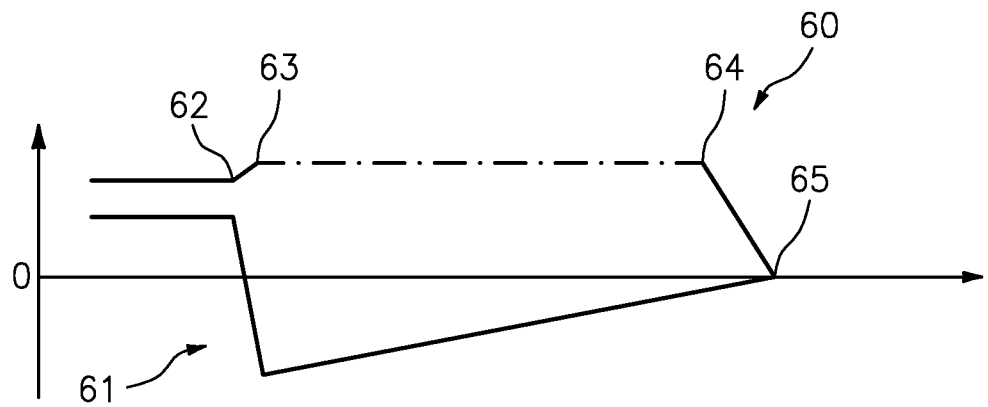
FIG. 7 is a graphical representation a method of controlling the backspin of a downhole pumping system of the prior art.
Figure 13:
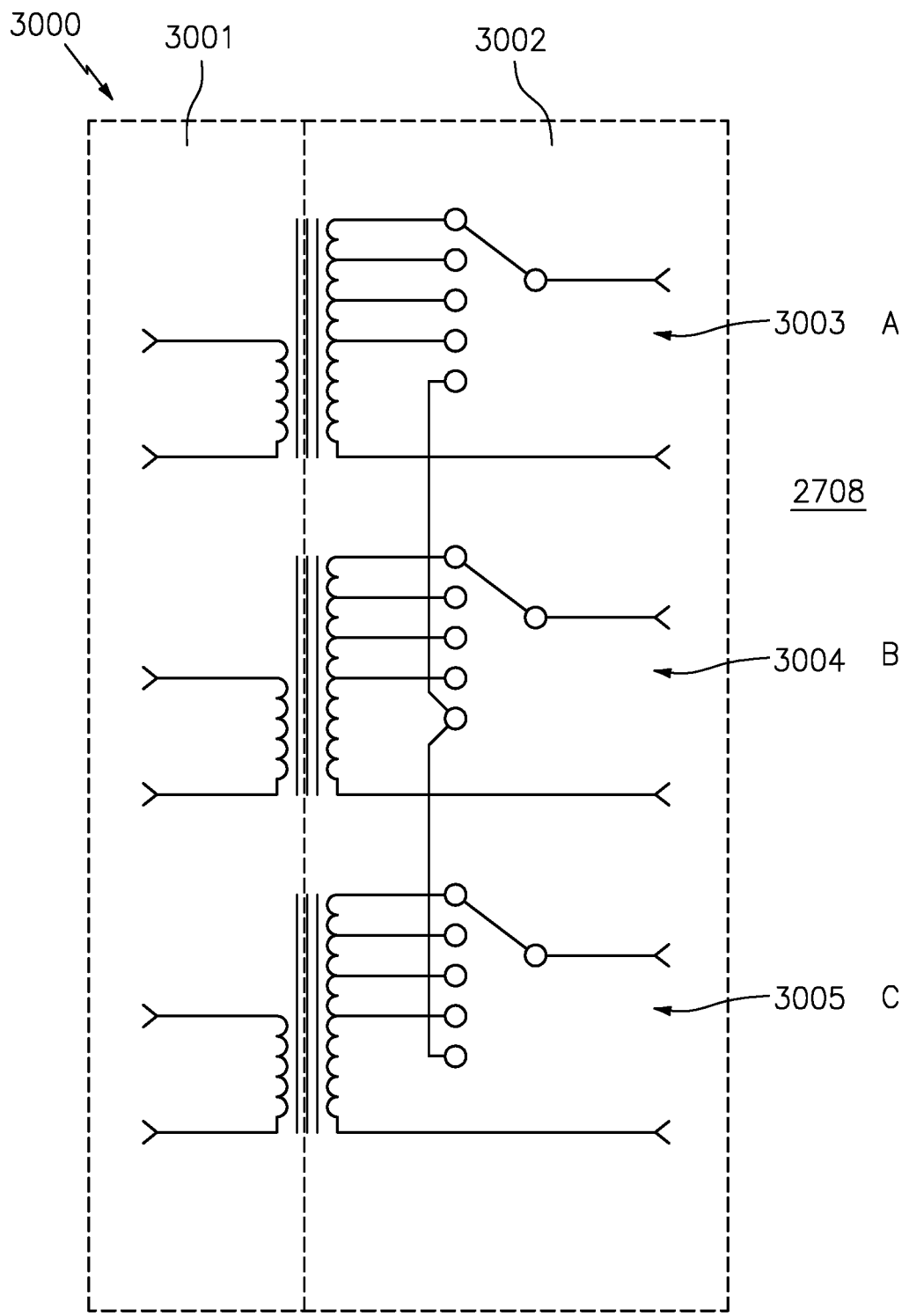
FIG. 13 is an electrical schematic of a tap changer in of the prior art.
Figure 14:
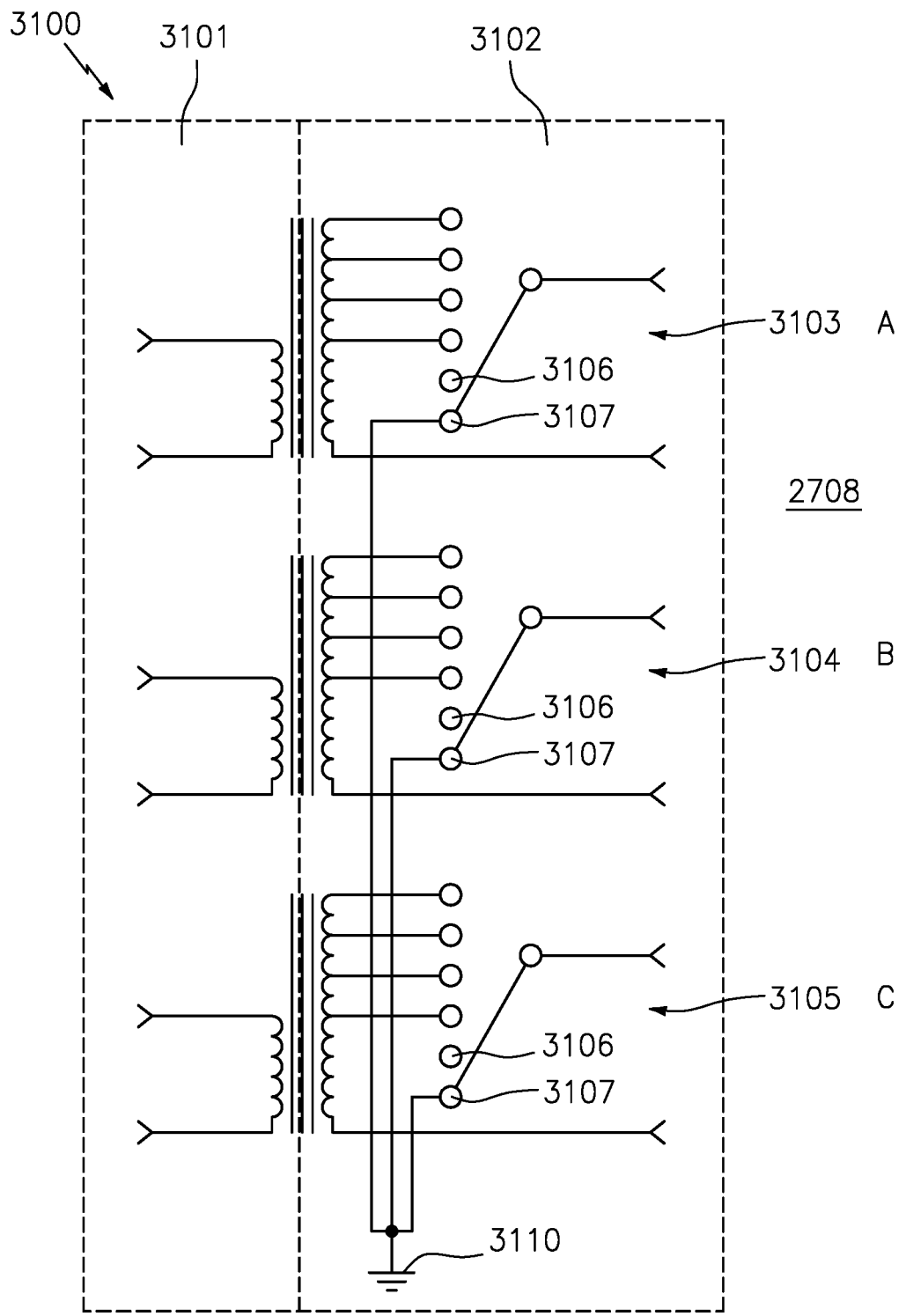
FIG. 14 is an electrical schematic of a tap changer in accordance with certain embodiments of the present disclosure.

If desired, an additional switch, such as a tap changer, can be employed between the drive 22 and the system control module 80. In some embodiments of the present disclosure including electric submersible pumping (FIG. 3), a pump 12 and attached motor 10 are deployed deep in a borehole 2 and an electric cable 15 is brought from the motor to surface. Typically, the motors are operated at over a thousand volts. Most surface control equipment such as variable speed drives 22 are operated from low-voltage supplies, such as 480V. Therefore, a step-up transformer 23 is used between the drive 22 and the surface junction box 20 to the motor. It is known for step-up transformer 23 to have a voltage ratio of seven times or more, and conversely the control equipment current can be seven times or more of the actual motor current. It is preferable to place the switch between motor 10 and transformer 23 as it may then have a lower current rating, and it isolates the transformer windings as well as the control equipment 22, 24 from the motor. However, in view of the high voltage on the motor side of transformer 23 such a switch may ordinarily be an expensive addition to the surface equipment. Such transformers of the prior art are widely used and incorporate multi-position tap changers to permit coarse matching of the transformer ratio to a given installation requirement. Referring to FIG. 13 there is shown a tap changer 3000 of the prior art and commercially available from such sources as the Maier Group and includes rotary switch and linear switch types. Tap changer 3000 includes a primary side 3001 and a secondary side 3002 in electrical transfer arrangement and a set of taps 3003, 3004, 3005 for each of the three phases A, B, C and is shown with a selectively moveable contact switch connected to the highest output tap. It should be appreciated by those skilled in the art that that the primary side 3001 can be interconnected with drive 22 in wye or delta and similarly the secondary side 3002 can be interconnected in wye or delta to the junction box 20. In the prior art it is known to incorporate a tap changer 3000 within the enclosure of transformer 23, which is sensibly designed for high voltage. Further known, tap changer 3000 can be installed in the oil-filled winding compartment, which provides an elevated level of electrical insulation and arc suppression. In such an embodiment, the function of transformer 23 is integrated with tap changer 3000 resulting in an economical solution to the safety problem with no impact on other equipment such as junction box 20. It should be noted that there are also dry-type (non-oil filled) transformers and it is possible to integrate the switch in the same way. Now referring to FIG. 14, there is shown an embodiment of the present disclosure of tap changer 3100 which is similar to tap changer 3000 wherein it includes a multiphase primary winding 3101 and a secondary side 3102 and a set of output taps 3103, 3104, 3105 for each of the three phases A, B, C. The multiphase primary winding 3101 can be coupled to a multiphase power supply and the contacts of the secondary side can be electrically coupled to any electrical load, or electric machine. In this particular example, tap changer 3100 of the transformer is electrically coupled to motor 10. In this particular embodiment, each set of taps 3103, 3104, 3105 further includes an open contact 3106 and a shorting contact 3107, which may optionally be grounded at 3110, and when positioned as described herein above with reference to tap changer 3000, tap changer 3100 works to electrically isolate the motor when in the open contact 3106 position and to short the terminals together when positioned in the shorting contact 3107 position. Such isolation when in open contact 3106 position protects an operator working between tap changer 3100 and drive 22 or other surface equipment. Shorting when in shorting contact position 3107 further protects an operator, insulation system, motor 10 and pump 11 by eliminating surface voltage and providing a path for generator current, which in turn results in a braking torque that limits the motor speed as described herein above. In addition, it can be desirable to employ a system monitor such as a voltage monitor, a current monitor and a speed monitor in order to alert an operator to the presence or the absence of motor rotation as described herein above. In certain circumstances such operation can be required for safe working practice over and beyond the protection afforded by the shorting relays described herein. If a shorting position 3107 is used, preferably a current monitoring facility for field purposes as described for FIG. 6 could be incorporated. In reference to FIG. 14, options such as having only an open tap position or only a shorted tap position, adding the position or positions at the low or high voltage end of the transformer tappings, and an omission of the ground connection 3110 of the shorted position all fall within the scope of the invention. This may be required for safe working practice over and beyond the protection afforded by the shorting relays. If a shorting position 3107 is used, preferably a current monitoring facility for field purposes as described for FIG. 12 could be incorporated.

Referring back to FIG. 12, it will be apparent to a person of reasonable skill that there are several possibilities for the interface signals between interface unit 90 and the drive 22, all of which fall within the scope of the invention. For example, in certain circumstances the interface unit 90 may accept an input signal from an operator to open the relay 83 so that the drive 22 can restart the motor 10 without a short-circuit trip. The interface unit 90 may output a signal indicating that the motor 10 is turning too quickly for the relay 83 to be safely opened. In the event that the drive 22 is stopped, such as due to power supply failure, the open-relay signal must be released and the relay 83 closed according to conditions disclosed herein after. In circumstances when the drive 22 trips through a fault, or is commanded to stop, or there is a supply power failure, as the shorting relays 83 are normally closed they do not need additional control/power circuitry to close in the event of supply power failure.

It has been discovered that the braking short may not simply be applied immediately upon the loss of drive power. The timing of the application of the system control module 80 is an important aspect of the present disclosure which can best be understood from the known sub-transient behavior following a short-circuit of permanent magnet generators (i.e. a freely turning or a mechanically driven PMM). A sudden short-circuit applied to a spinning generator will result in a short duration current, potentially large enough to instantly demagnetize the motor, and a momentary large increase in torque potentially large enough to damage the shaft-line. As will be known to one skilled in the art, this dynamic behavior is not represented in the simple electrical models of PMMs used to describe most operating behavior, such as for vector controls. Therefore, it is an important aspect of the present invention to include a delay period before the application of the shorting of shorting relays 83 of system control module 80 until the motor speed has reduced sufficiently to prevent the above described large sub-transient currents from developing. As an example, if an ESP is running normally at 3000 rpm, then when the drive 22 stops, the fluid weight in the tubing 15 will rapidly drive the speed of motor 10 down to zero and then into reverse (or backspin) direction, possibly reaching a reverse speed where sub-transient current can again be a problem. During the optimal time window when the rotational speed is typically below 300 rpm, in either direction, the shorting relay 83 can be safely be closed.

Figure 11:
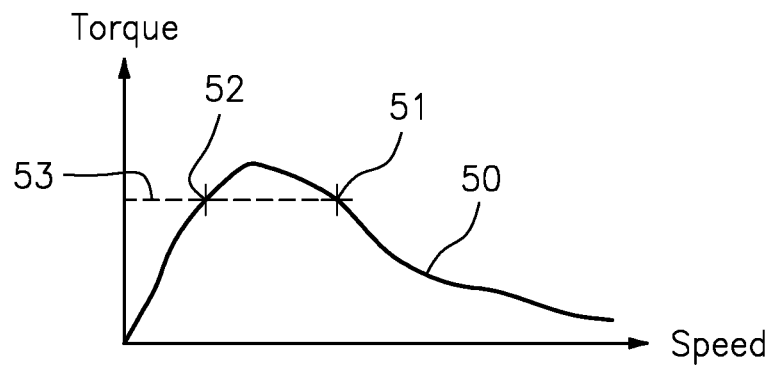
FIG. 11 is a graphical representation of the steady-state braking characteristics of a typical PMM of the prior art.

In addition, for a downhole pumping system that includes a PCP, the closing of shorting relay 83 should be done, at a predetermined backspin speed before the backspin speed reaches the limiting speed shown as point 51 in FIG. 11. Above that speed, the braking torque will be less than the torque available from the pump and so shorting will not be able to limit the speed of the motor, which can lead to damage in the system. Therefore, it is an important part of the invention that there is an optimal time window for operation of the shorting relay for both PCPs and ESPs.

As described herein above, when drive 22 stops, pump 12 continues to rotate in its normal direction, pumping, while the pump and motor shaft decelerate. The decelerating pump and shaft rotor inertias provide the matching torque as the speed drops. The short-circuit optimal time window for operation of the shorting relay 83 is very short for PCPs since the torque applied to the pump by the fluid column is essentially constant while the pump decelerates then reverses. Many aspects of a particular downhole pumping system may influence the optimal time window for operating the shorting relay 83, and we have discovered that ESPs react significantly different from PCPs from this perspective. A characteristic of downhole pumping systems utilizing ESPs is that the torque needed to turn them for a given lift is proportional to speed squared. Consequently, after the drive 22 is stopped and as the rotational speed drops, the rate of deceleration reduces, and the effect is to prolong the time to reach the optimal time window for operation of the shorting relay 83 and the reduction to a safe shorting speed by potentially up to two to three seconds.

Embodiments of the present invention include an apparatus, such as an observer, for measuring the speed of the motor 10, or a parameter associated with the speed of the motor or an equivalent indication, to determine the beginning of the optimal time window for operation of the shorting relay 83. The use of such observer-based speed estimates can quickly determine the optimal time window for operation of the shorting relay 83. In certain embodiments, prior to shorting the motor phases, the speed can be determined from the frequency and/or amplitude of the phase voltages, measured as described herein above with respect to the potential divider comprised of resistors 86, 87 (FIG. 12). The use of speed estimates can quickly determine the optimal time window for operation of the shorting relay 83. After the motor phases are shorted, the speed of the motor can be determined from the frequency and/or amplitude of the phase currents. A simple method of obtaining the frequency of the phase currents is simply to measure the rate of zero crossings of these signals. This method can be difficult when the speed of the motor drops below a certain low level as the measurement amplitudes will be small and potentially noisy, with a low frequency on the order of a few Hz. In such observer based embodiments, the observer makes use of the current measurements continuously, even at low and noisy amplitude, as the speed of motor 10 reduces to a low value, and produces both speed and rotor angle estimates. The use of such observer-based speed estimates can quickly determine the optimal time window for operation of the shorting relay 83. Estimation of the rotor angle, such as by an observer, from phase currents with the phase connections shorted, is an important aspect of the present disclosure for restarting the motor 10 as will be described more fully hereinbelow.

An observer based method requires suitable processing hardware and software, and where the drive 22 design is accessible, it may best be implemented in the drive itself. Alternatively, in embodiments where it is not possible or practical to include such processing hardware and software physically within drive 22, a so-called black-box design may be needed to work in conjunction with a sophisticated control unit that also controls the drive. An embodiment of the present invention can implement control of the relays 83 as a central function of the drive 22, or other sophisticated control unit which can be mounted external to the drive, so observation of current and use of an electrical model of motor 10 will allow estimation of the motor speed, and as will be described herein below, rotor angle for extended control purposes.

In another embodiment of the present invention a powering means of holding the relay 83 open (not shown) for the necessary delay period to the start of the aforementioned optimal time window could be provided. An important reason for such a means is to enable the relays to be controlled even in the event of a power supply failure. A reliable and cost-effective embodiment of this feature can use known super-capacitors rather than batteries or uninterruptible power supplies to maintain control module 80 and relay power for a few seconds, wherein the delay period could be significant as in the case of ESPs as described hereinbefore. For example, a one Farad capacitor will supply four amperes for one second with only two volts discharge. It should be appreciated that with respect to the present invention, equipment operating at 24V can typically tolerate such a small voltage drop.

In yet a further embodiment of the present invention, if the control functions described herein are incorporated into drive 22, the drive itself can achieve electronic short-circuiting by means of outputting zero vectors as hereinbefore described. This allows motor 10 to be short-circuited immediately after the aforementioned delay period for safe shorting speed (as described herein above) has been reached. As a practical benefit, use of a zero vector output reduces the voltage across the relay 83 to zero before the relay contacts close, which works to prolong the life of the contacts. Since the zero-vector provides a current path in parallel with or alternatively to the shorting relays, the motor phase current should be measured, not the relay current, if backspin speed is to be monitored. It should be noted that, as used herein, the terms "short-circuit braking" and "braking short" shall refer to short-circuiting methods including shorting relays 83 and zero vector output control.

Figure 15:
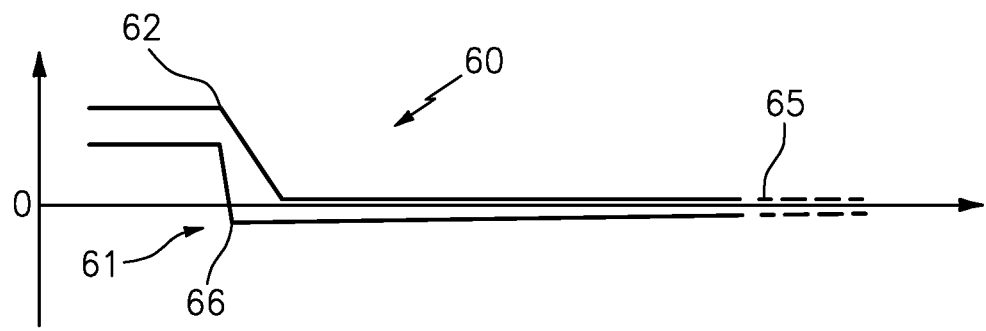
FIG. 15 is a graphical representation of the braking characteristics for a pump in accordance with certain embodiments of the present disclosure.

Referring now to FIGS. 8 and 15, application of short-circuit braking in an embodiment of the present invention is shown. In FIG. 15, drive bus voltage (41 in FIG. 2) is depicted by upper curve 60 and motor speed is depicted by lower curve 61 against the y-axis versus time along the x-axis. The drive bus voltage 60 can be provided by a monitor in drive 22 and produce a drive bus voltage signal. The drive bus voltage 60 and motor speed 61 are initially at their normal predetermined values as controlled by drive 22. When the drive 22 is stopped voltage 60 starts collapsing as shown at point 62. The motor speed 61 simultaneously slows and when it reaches a sufficiently low absolute value, as described herein above, the motor 10 is short circuited. The backspin speed does not overshoot beyond a low (in absolute terms) negative value 66, thus preventing damage to the equipment. The graph of FIG. 15 illustrates that the application of the short-circuit braking of the present invention achieves the necessary safe backspin function, i.e. slows the motor to a safe level. It should be noted that with the short-circuit braking in effect, protection of the downhole pumping system is also provided against well-kicks and accidental injection of fluid into the well, since braking torque is developed regardless of actual motor direction. In addition, and with particular regard to downhole pumping system comprising ESP-type pumps 12, the fluid column drains through the pump and into the well until equilibrium is reached (pump head approaches zero) and the motor has sensibly stopped rotating at a zero speed, shown as point 65.

The aforementioned embodiments of apparatus and control cover the critical period from when the drive 22 stops and until it can safely and effectively be restarted. Although the downhole pumping system is rendered safe by the present invention, the backspin duration can continue for hours in some cases, which is undesirable if drive power is available to restart pumping. This is a particular problem for downhole pumping system comprising a PCP, wherein a significant amount of fluid does not leak through the pump, thus making the backspin duration very long. In such cases, it is desirable to have a method of draining the fluid more quickly and restarting.

Figure 2:
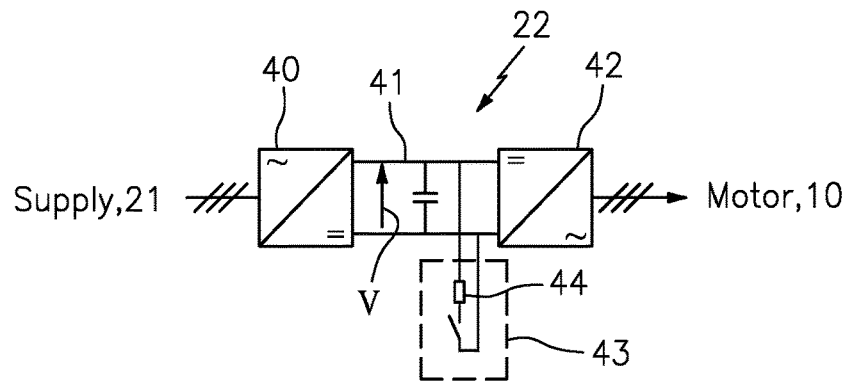
FIG. 2 is a schematic representation of an electrical diagram of a brake chopper module of the prior art.

Embodiments of the present disclosure including methods for shortening the backspin time and hence minimizing loss of production will be described directly herein below. The methods are described separately for ESPs and PCPs due to the very different characteristics of these types of pump. Such disclosed methods consider application and control of the proposed apparatus and drive 22 to perform backspin speed control, fluid column draining, and motor restarting. The methods are described with reference to the hereinbefore described control module 80 and drive 22 (FIG. 8) and representative inverter 42 (FIG. 2), and possibly with the inclusion of a representative brake chopper module 43 (FIG. 2). In the description of some of the methods, reference is made to scalar and vector control of the drive 22, but their application is equally possible for drives employing other control methods, such as direct torque control (DTC).

The methods of the present disclosure can be applied when the resumption of supply power to the drive 22 occurs or power is otherwise available, to the extent needed for the methods to operate, such as for the control circuits and the IGBT driver circuits. Typical means for providing this power are batteries and super-capacitors, which may be charged from the main power supply when power is available, or from the generated power of a back-spinning PMM.

Figure 16:
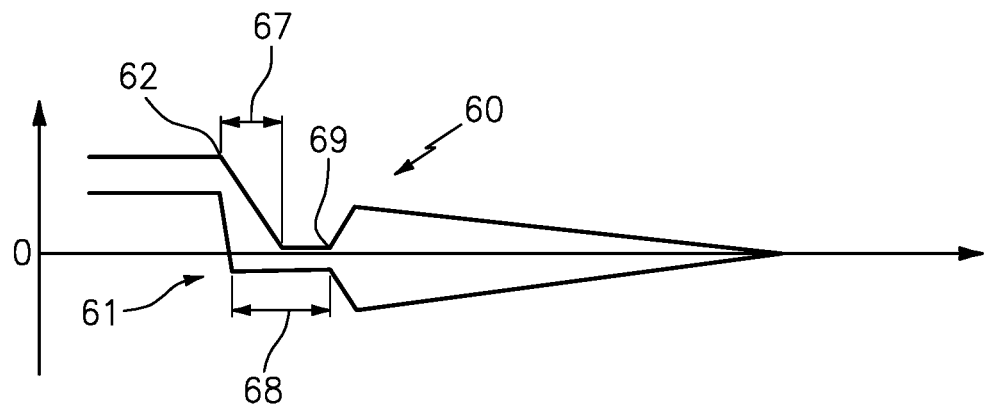
FIG. 16 is a graphical representation of the braking characteristics for a pump in accordance with certain embodiments of the present disclosure.
Figure 17:
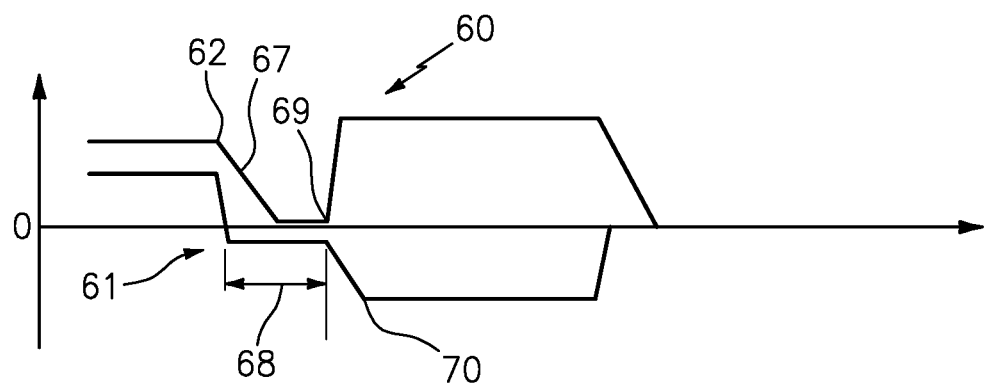
FIG. 17 is a graphical representation of the braking characteristics for a pump in accordance with certain embodiments of the present disclosure.

With reference to FIGS. 8, 16 and 17 the control of a downhole pumping system comprising an ESP in accordance with the present invention will be described. Drive bus voltage (41 in FIG. 2) is depicted by upper curve 60 and motor speed is depicted by lower curve 61 against the y-axis versus time along the x-axis. The drive bus voltage 60 and motor speed 61 are initially at their normal predetermined values as controlled by drive 22. Initially, motor 10 is running at normal speed and the bus voltage is normal, until the drive is stopped at point 62, i.e. the motor is commanded to stop or there is a fault such as a momentary supply power loss. After the delay period hereinbefore described, drive 22 outputs a zero vector (in the case where the drive power is available) and/or the relay 83 can be closed, and the motor speed is limited, which is in the interval marked 67. If the power supply has not failed it is preferable to continue to use the drive zero vector.

Now with specific reference to FIG. 16, there is shown an example embodiment of the present invention whereby the braking short is applied and is continued for a period of time 68 while the pump head reduces. The shorting period 68 can be a predetermined conservative time or determined by monitoring or estimating pump head from downhole gauge 30 pump intake and discharge pressure measurements, or by motor speed and current determined from apparatus 80 (FIG. 8) or from the drive 22. The shorting period 68 is then stopped, i.e. the braking short is then opened or equivalently the zero vector is released, indicated by point 69 and the backspin speed will increase (towards the negative direction). As the head was reduced during the shorting period 68 due to pump leakage, the associated generated voltage will not be enough to charge the bus 41 (FIG. 2) above its normal level.

After the shorting period 68 in FIG. 16, because the motor 10 is turning faster than during the shorting period, the fluid column will drain faster and the remaining backspin period will advantageously be reduced over that provided by the method described with reference to FIG. 15 herein above. The backspin speed in FIG. 16, after the braking short is released at point 69, in response to a release signal, at a safe speed, but the rotor speed continues to reduce as the fluid column drains. Referring now to FIG. 17, there is shown a method of controlling a downhole pumping system of the present invention wherein drive 22 is preferably of the sensorless vector control type and is configured to drive motor 10. In this particular embodiment, after the braking short is released, indicated by point 69, the drive 22 can make use of the observed speed and angle to synchronously restart the PMM 10 in the reverse direction, known as a reverse flying restart, and then increase the backspin speed to an acceptable maximum based on the pump characteristics shown as point 70. Because the drive 22 is actively driving the motor 10 in reverse, it is putting power into the pump 12, i.e. is not acting in a (regenerative) braking mode, and accordingly does not need a means to absorb power. Therefore, for example, a brake chopper module 43 of FIG. 2 is advantageously not required. It should be appreciated by those skilled in the art, that because of the increased backspin speed, the time taken for the fluid column to reduce will be shortened and normal operation of the downhole pumping system can then be resumed.

Other parameters related to the downhole pumping system can be used to augment the control of the motor and help determine when to stop driving the pump 12. For example, the present invention can control the downhole pumping system by using information provided by a downhole gauge (32 in FIG. 8). By use of a downhole pressure gauge 32, which determines the fluid pressure in the tubing at point 35 above pump 12, it is possible to determine when the fluid column has substantially drained back into the well. In this particular embodiment, it is possible to control motor 10 using pressure measurements to, for example when the pump 12 is driven in the backspin direction, determine when to stop driving the pump before the pump runs dry. Other methods, such as examining the reducing motor current or using the pressure at pump intake 14 as the casing 2 fills with draining fluid, may also be used to determine when to stop driving the pump 12. Other methods of determining when to stop driving the pump 12 fall within the scope of the present invention. As a further example, the drive 22 can be halted (without applying a zero vector) from time to time to let the motor revert to its natural backspin speed depending on the head pressure. If the speed indicates that significant head remains, then the motor 10 can be restarted in the backspin (negative) direction.

Restarting in the forward pumping direction can be attempted when an acceptable restart condition exists such as when the natural backspin speed falls below a certain threshold, or as a result of methods to control the backspin and/or draining as described herein above, typically a few hundred rpm as the torque applied to the pump by the descending fluid is very low.

The friction, positive displacement and relatively low operating speed characteristics of PCPs pose particular problems when a drive 22 is stopped. Systems and methods of the present disclosure deal with these problems from the moment the drive 22 is stopped until it is restarted for normal pumping. For example, it is possible that when the motor drive 22 stops, the fluid column weight will not be sufficient to overcome the breakout torque and the pump will not backspin, even without the use of a braking short. In this case the fluid column would drain slowly through the pump leakage and restarting of motor 10 can be attempted in the forward (lifting) direction. However, as explained hereinabove, the torque required to start a PCP is the sum of the breakout friction torque plus the torque needed to lift the fluid column (whereas when the pump is turning there is a reduced steady friction torque). If the motor 10 has been sized with enough torque capacity, it may be able to provide this starting torque. If a smaller motor is used, however, with the purpose of reducing the system cost, it may be unable to start. In this latter case, the fluid column must be drained before a restart can be attempted. It is a goal in certain embodiments of the present disclosure to minimize the starting torque, and therefore the cost and size of the motor, by substantially actively draining the fluid column before restarting.

Figure 18:
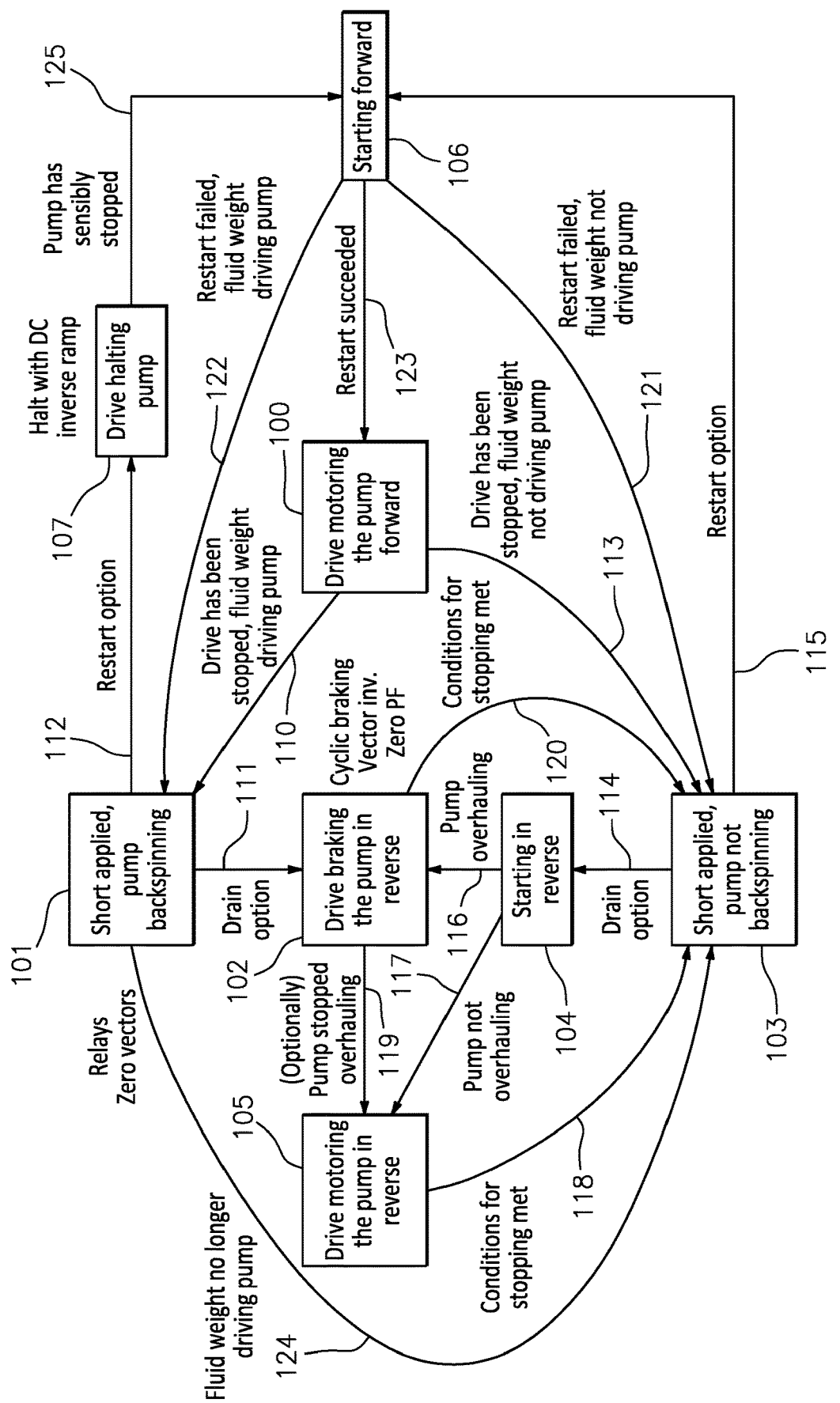
FIG. 18 is a state diagram of a pumping system in accordance with certain embodiments of the present disclosure.

In reference to FIG. 18, the methodology is now explained in terms of a state machine, and then with reference to FIGS. 8, 19, 20, 21, 22 and 23 particular embodiments of certain actions in the methodology to control a downhole pumping system comprising an PCP in accordance with the present invention will be described. The state diagram of FIG. 18 is shown as a generic technique for representing system behavior in accordance with the embodiments of the present disclosure as will be appreciated by one skilled in the art. In FIG. 18, rectangles 100-107 represent states of the system, based on what the drive and the pump are doing in that state. Arrows 110-125 represent conditions that cause the system to go from one state to another.

The initial state, for purposes of explanation, is that the drive 22 is running the motor 10 and pump 12 normally, in a forward rotational direction, which is state 100 in FIG. 18. While in this state, if the drive is stopped e.g. due to a power loss or a user command, then if the fluid column weight above the pump is sufficient to overcome the pump breakout torque and cause it to backspin, in a backward rotational direction, the system will transit to state 101 through 110, otherwise it will transit to state 103 through 113. In an embodiment, a braking short will be automatically applied on entry to states 101 and 103.

From state 101, with the backspin speed safely limited by the braking short, there are three possible transitions. First, the user may request a restart directly or the drive may be set to auto-restart after a given period. The system then transits through 112 to state 107, in which the drive is used to slow the pump to a very low speed, referred to herein as the predetermined minimum backspin speed, or a stopped rotation, after which is automatically transits through 125 to its normal starting procedure 106. Preferred embodiments for stopping the pump in state 107 are described hereinbelow. Second, the user or selected drive configuration may advantageously require the fluid column to be quickly drained to reduce the required starting torque and so facilitate restarting with an economically sized motor, as hereinbefore described. This drain option 111 will take the system to state 102, where the drive is braking the back-spinning pump. Third, the fluid column can be left to drain slowly, at the safe backspin speed resulting from the braking short applied in 101 until the fluid weight can no longer drive the pump, thus leading to state 103 through transition 124.

With reference to state 102, embodiments using the drive for braking the pump at a higher speed than when using the braking short are described hereinbelow. In this state, power is being absorbed from the motor. The drive continues to operate in state 102 until the fluid column weight becomes insufficient to drive the pump in reverse without drive assistance. Depending on how the drive has been configured, it may then stop and the system will transition along line 120 to state 103. Alternatively, the drive may seamlessly switch from braking to motoring the pump in reverse so as to continue draining the fluid column, taking the system to state 105 through transition 119.

While in state 103, the drive is stopped, but the fluid column is insufficient to overcome breakout torque so the pump is stationary. The user may request a restart directly or the drive may be set to auto-restart after a predetermined period of time. The system then transits through 115 to state 106, normal starting procedure. Alternatively, the user or selected drive configuration may advantageously require the fluid column to be drained to reduce the required starting torque and so facilitate restarting with an economically sized motor, as hereinbefore described. Because the pump is stationary and the fluid column is required to be drained in a controlled draining operation of the system, the drive can be used to start the pump in reverse and so the system transitions along line 114 to state 104.

State 104 is a transitory state, during which the drive 22 starts the motor 10 in the reverse direction, and along with state 102 are referred to herein as a controlled draining operation, and at the same time monitors the behaviour of the pump. If, after the drive overcomes the breakout friction torque to turn the pump, the fluid column weight can be sufficient to overcome the running friction, and the pump will begin to overhaul, i.e. try to accelerate the pump and motor in reverse. In this particular embodiment, it should be appreciated that shift from a stationary condition to an overhauling condition, caused by the act of overcoming breakout torque, can be handled by moving along 116 to state 102, which has been described hereinbefore. If instead, the fluid column weight is insufficient to overcome the running friction, the system will transition along 117 to state 105, where the drive continues draining the fluid column by motoring the pump in reverse. In this manner this embodiment therefore succeeds in draining the fluid column and making it possible to use an economically sized motor whether the pump backspins or not after stopping the drive and whether an initially non back-spinning pump changes to overhauling during the draining process.

While in state 105, the drive will continue to drain the fluid column by motoring the pump in reverse. Unlike state 102, power is supplied to the motor. The motor must be stopped before running the pump dry, perhaps using methods mentioned hereinabove with respect to ESPs, for example by monitoring the pump intake pressure and comparing it against a predetermined threshold. This results in arriving at state 103, through transition 118.

Finally, state 106, which is entered via the aforementioned transitions 125 and 115, is a transitory state representing the normal motor starting procedure. The possible exit transitions relate to the success of the restart attempt. If starting is successful, the system returns to the herein first described state 100 through transition 123, and the cycle of running, stopping and restarting is complete. If starting is unsuccessful, such as the motor stalling due to high breakout torque adding to the torque needed to lift the fluid column, the system will move to state 101 through transition 122 or to state 103 through transition 121, depending on whether the fluid weight is respectively sufficient to turn the pump in reverse or not.

It should be noted that the embodiments of the present disclosure include methods to optimize the speed of draining to reduce problems that can occur due to the aforementioned sand debris that can be included in the column above the pump. It is known that sand descends within production fluid at a rate known as the particle settling velocity. It is advantageous to control the draining at a rate faster than the descent rate of the fluid column is greater than the sand particle settling velocity. In such embodiments methods are performed to produce the controlled draining at a rate faster than the particle settling velocity of the sand, and in some cases twice as fast, wherein the rate is sufficient to prevent the sand from blocking the pump.

Embodiments of the present disclosure that address the various states shown in FIG. 18 will be set forth in detail directly herein below, including novel techniques for their implementation. With specific reference to FIG. 18 state 102, a first embodiment can be understood with reference to FIGS. 22 and 23. The drive bus voltage (41 in FIG. 2) is depicted by upper curve 60 and motor speed is depicted by lower curve 61 against the y-axis versus time along the x-axis. The drive bus voltage 60 and motor speed 61 are initially at their normal predetermined values as controlled by drive 22. Initially, motor 10 is running at normal speed and the bus voltage is normal, until at point 62 the drive is stopped, i.e. the motor is commanded to stop or there is a fault such as a momentary supply power loss. After the requisite delay period hereinbefore described, a braking short is applied and the motor speed is limited during the braking period 68. During braking period 68, the pump head reduces, corresponding to the example for an ESP described herein above with respect to FIG. 16, and then the braking short is released at point 69 thus defining a predetermined braking period. It is important to note that, unlike an ESP, when the braking short is released the backspin speed of a PCP can quickly surge to a very high reverse speed, and it must be shorted again before the speed becomes too high. The drive 22 in this particular embodiment is configured to alternately apply and release the braking short at a given frequency and with a controlled duty cycle, producing the cyclic operating curve shown in the figure. By varying the zero vector duty cycle, the average backspin speed can be effectively controlled. A method such as an observer to estimate backspin speed can be used to provide feedback for a speed controller that determines the zero vector duty cycle to adjust the speed to the given reference. When the speed needs to be decreased (in absolute terms) the duty cycle must be increased, and vice-versa. In this particular embodiment, the reference speed will generally be higher than the backspin speed, thus helping drain the fluid column more quickly.

In this embodiment the switching frequency should be higher than the mechanical response time of the system and should typically be at least tens of hertz so that the pump's speed variation is limited. In particular, the switching frequency can be hundreds or thousands of hertz, resulting in a smooth backspin speed shown as 59 in FIG. 23. During braking period 73, note that if, in contrast, the switching frequency is low, perhaps a few hertz, the braking short will again be released at the start of the interval but as soon as it is re-applied to limit the speed it will remain shorted until the end of the interval. The effect of this increased shorting duty cycle on the average backspin speed will then be negligible compared to the backspin speed with a permanent short. It will be appreciated that cyclic use of zero vectors, which are electronically produced, is preferable to the electromechanical shorting relays.

For the application of this method the drive 22 must be equipped with a braking module to apply a braking force on motor 10. Part of the power absorbed from the pump will have to be dissipated to a braking resistor, while some power will be dissipated to the motor-cable resistances, as well. Unlike in the hereinabove discussed prior art methods where brake choppers are activated at unacceptably high speeds, we have discovered that the method can operate even at low backspin speeds, as the cyclic shorting has a boost effect on the voltage generated by the motor. That is, even if the motor turns at low speed and thus generates low back EMF, this will be boosted by the drive to a level adequate to enable the operation of the brake chopper. This is because when the braking short is removed the inductive energy (primarily in the motor windings) is released through the diodes in inverter of FIG. 3 of the prior art. Such action will be recognized by one skilled in the art as a boost converter circuit. Moreover, in the case that the power absorbed by the braking resistor exceeds its rating, the method can automatically increase the shorting duty cycle, which will result in lower reverse speed and power dissipation and protection of the brake chopper module. This particular embodiment of the present disclosure determines what level of power dissipation to design for, affecting the cost of the chopper, unlike a conventional chopper application where the power dissipation is predetermined for the worst case.

Figure 4:
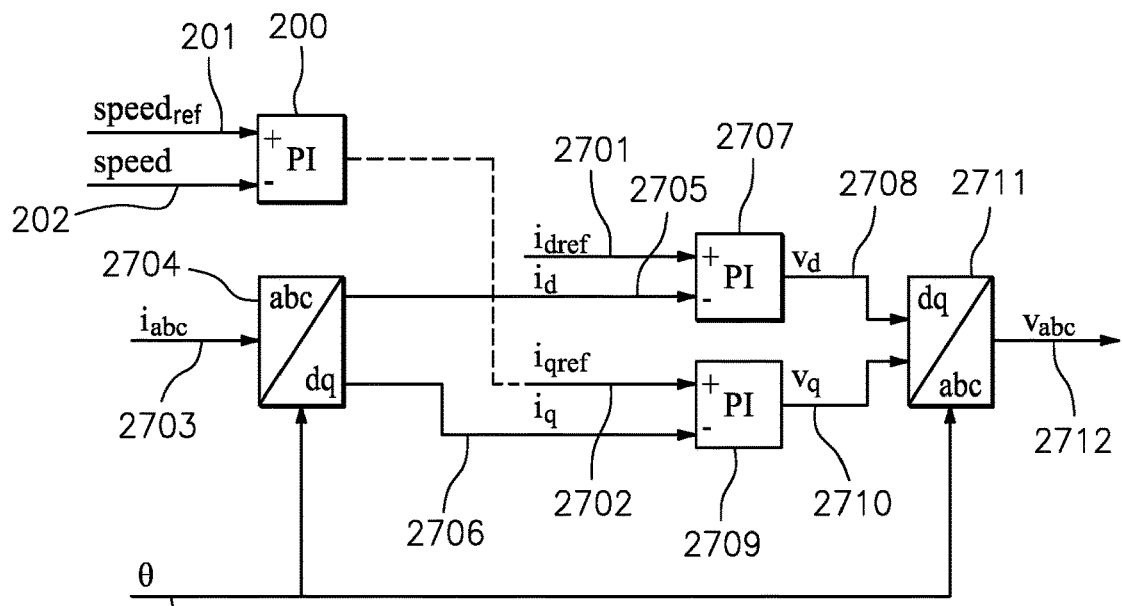
FIG. 4 is a schematic representation of an electrical diagram of rotor flux oriented control of the prior art.
Figure 5:
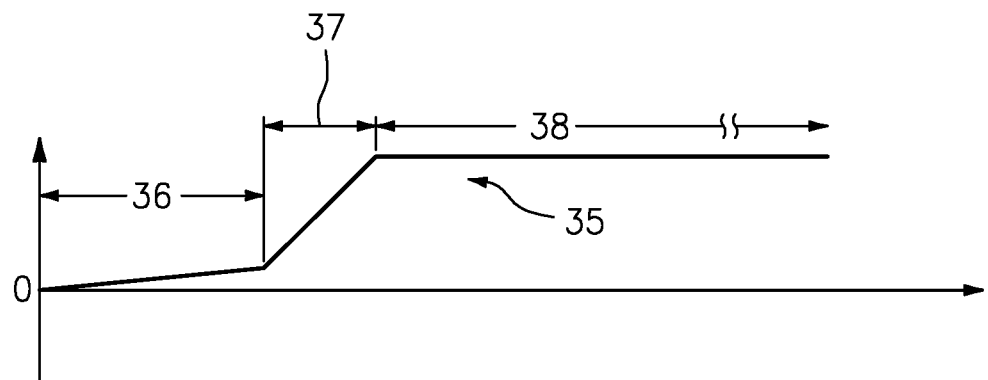
FIG. 5 is a graphical representation of a method of controlling the backspin of a downhole pumping system of the prior art.
Figure 23:
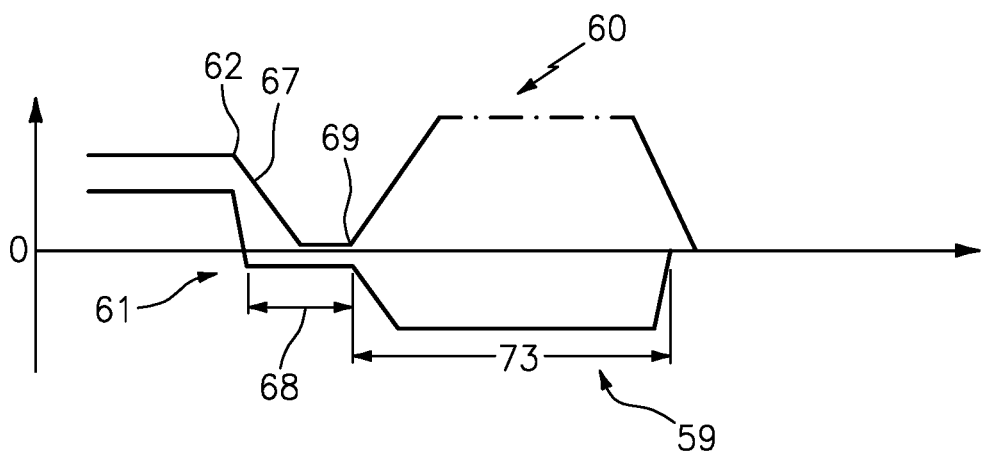
FIG. 23 is a graphical representation of the braking characteristics for a pump in accordance with certain embodiments of the present disclosure.

Again, and with reference to FIG. 18 state 102, another embodiment of the present disclosure can be best understood with reference to FIG. 23. It has been discovered that if a negative speed reference 201 in FIG. 4 is introduced, then the drive 22 will automatically adjust the current reference 2702 in FIG. 4 so as to maintain its speed constant. It should be noted that drive 22 is configure to command, configured to control and configured to monitor a plurality of parameters of motor 10. If the negative speed reference 201 is set below a certain predetermined level (determined by the relation between the mechanical power generated by the back-spinning pump 12 and the system power losses), the absorbed power will be dissipated as system losses, mainly on the cable and motor resistances and the drive 22 will advantageously not require a brake chopper module. In the case that the negative speed reference 201 is set above the aforementioned level, the drive will operate with a negative power factor (PF) and the absorbed power must be dissipated such as by using a braking resistor. The effect is similar to the aforementioned cyclic braking in that the back-spinning speed is sensibly constant and the back-spinning time is reduced. It can be determined when braking is no longer needed by monitoring the current reference 2702 in FIG. 4, which current reference will be reducing as the fluid column weight reduces. When the current reference 2702 is sensibly zero, the reducing fluid column weight must now only be just sufficient to match the pump friction torque. If the drive 22 is stopped at this point, the speed will drop to zero, as any further reduction to the fluid weight will not be sufficient to turn the pump 12.

Embodiments of motor braking using vector control advantageously offers higher braking torque capability and lower speed and torque ripple than cyclic braking because the current is absorbed synchronously with the rotor position and its waveform is more sinusoidal. Similar to cyclic braking, the backspin reference speed can be adjusted to match the selected brake resistor power rating. Cyclic braking can however also be used with a scalar drive, as knowledge of rotor position is not required.

Figure 1:
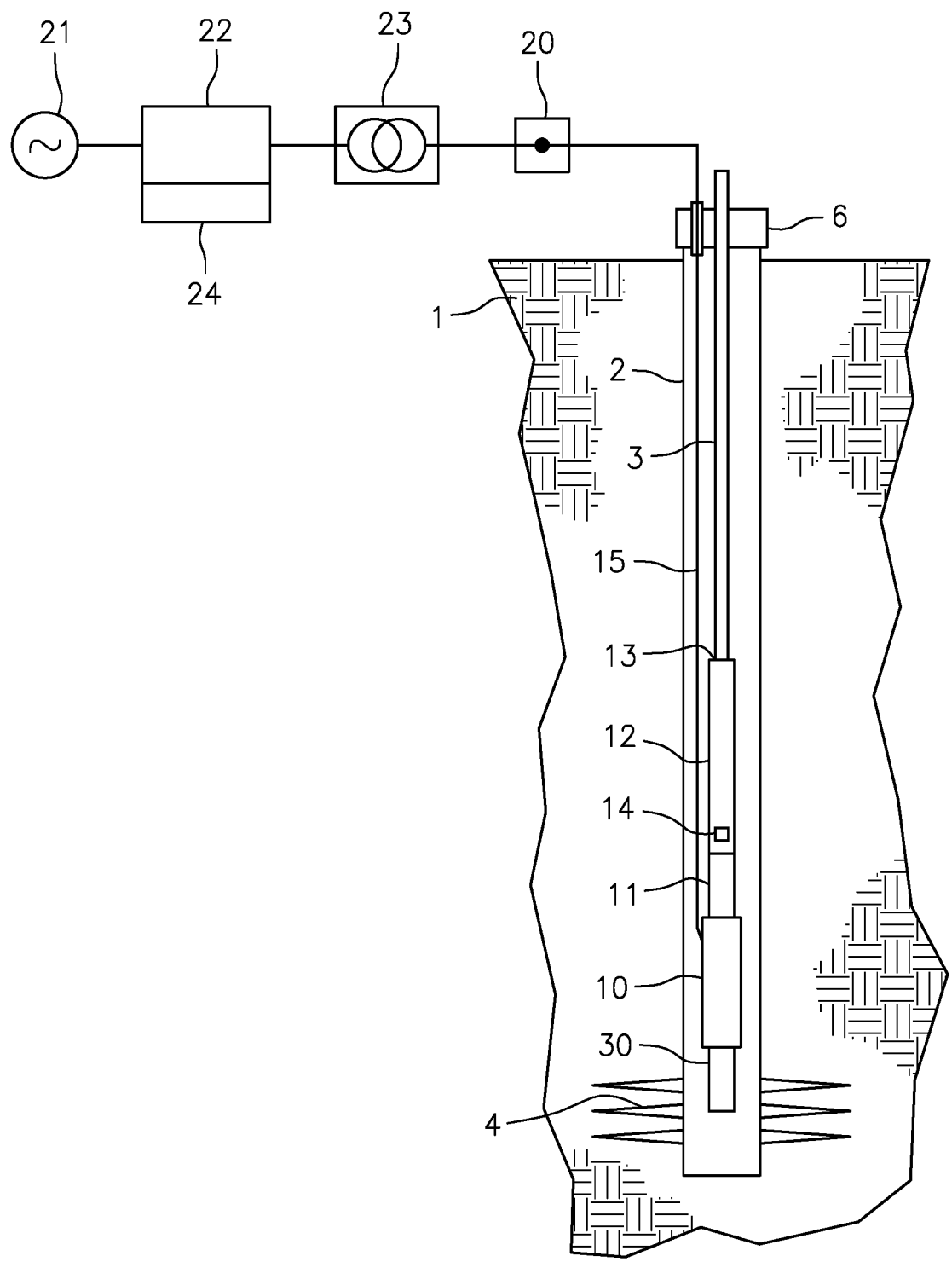
FIG. 1 is a schematic representation of a downhole pumping system of the prior art.
Figure 19:
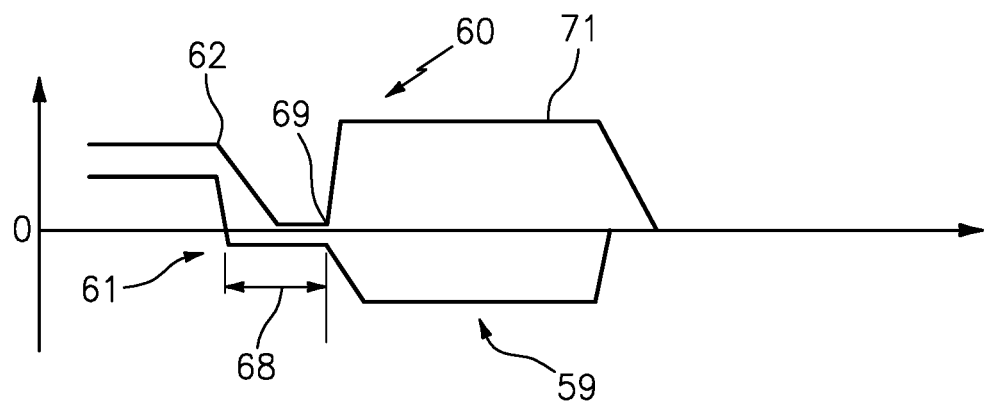
FIG. 19 is a graphical representation of the braking characteristics for a pump in accordance with certain embodiments of the present disclosure.
Figure 24:
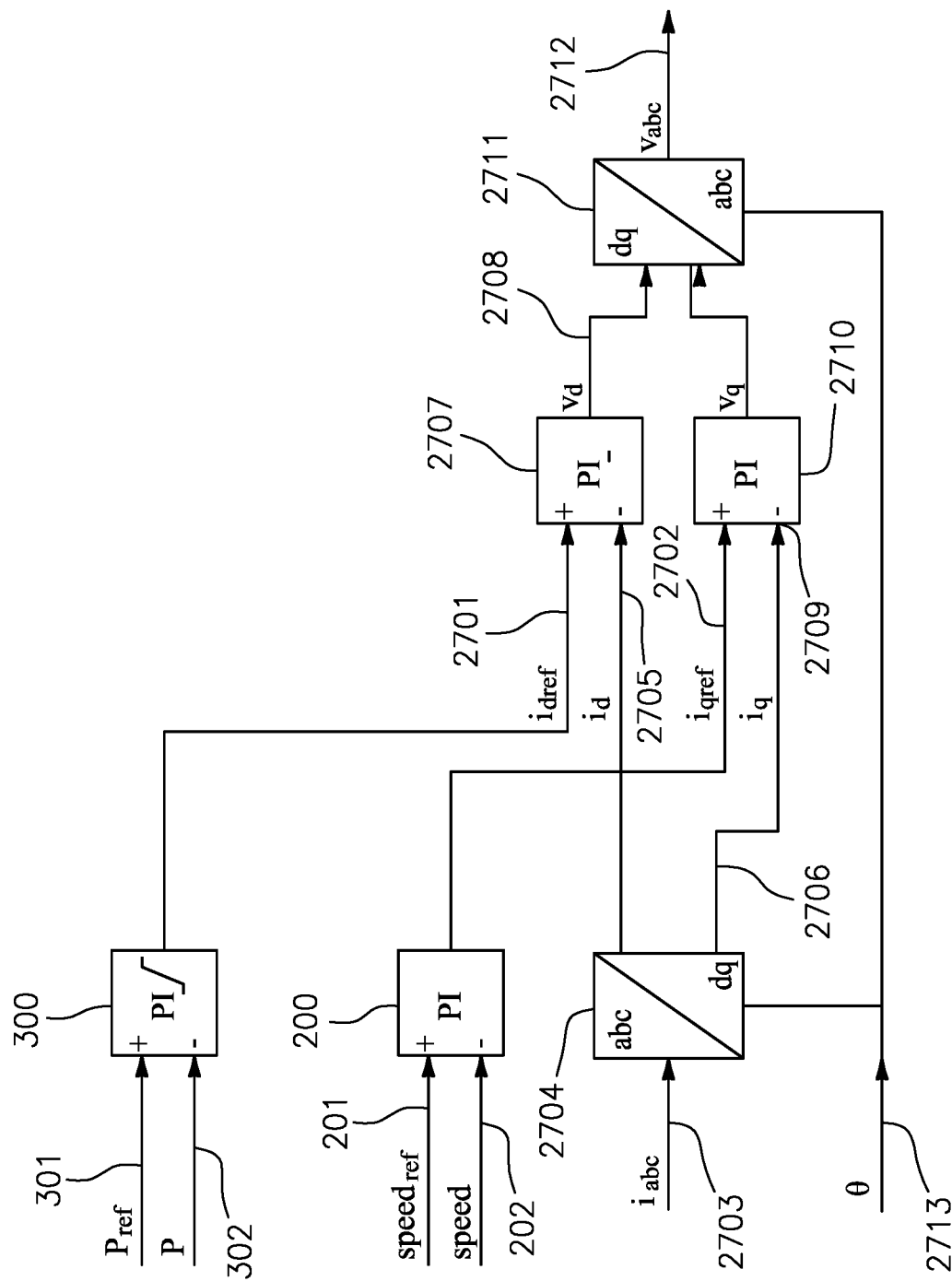
FIG. 24 is a schematic diagram of a control structure in accordance with certain embodiments of the present disclosure.

As explained hereinabove, for the vector control method to operate without the need of a brake chopper module, its negative speed reference 201 in FIG. 4 has to be set below a certain level. This restriction can prolong the draining procedure, as the reverse speed may be lower than desired. With reference to FIG. 19 and specific reference to FIG. 18 state 102, another embodiment of controlling backspin speed is now described, which advantageously employs vector control of drive 22 and the long cables 15 found in submersible pumping applications to achieve controlled backspin at higher reverse speeds without the use of a brake chopper 43 in FIG. 2, or other power absorbing means. In this particular embodiment, backspin control is achieved without power absorption in that the drive 22 does not absorb real power and the motor is maintained at a safe speed, such as a predetermined reference speed 201. Operation of the drive 22 with no real power absorption corresponds to operating it with zero power factor. A means of accomplishing this can be understood with reference to FIG. 4 and FIG. 24. As hereinbefore described, in normal motor operation, the quadrature current reference $i_{qref}$ 2702 is set to the level of the torque-producing current that is required and the motor direct current reference $i_{dref}$ 2701 is set to zero. In the embodiment being described, a PI controller 300 is used to regulate the drive real power output to $P_{ref}$ 301 which is set to zero, by adjusting $i_{dref}$ 2701, which will no longer be fixed at zero. The output of the PI controller 2707 is $i_{dref}$ 2701, its reference input is $P_{ref}$ 301 and its feedback input is the instantaneous real power output P 302 of the drive. Note that $i_{dref}$ 2701 should be limited to only positive or only negative values, with positive values being preferable to avoid PMM de-magnetization. The instantaneous real power output of the drive P 302 can readily be calculated from the drive output voltage and current measurements as known to one ordinarily skilled in the art. The method of the current embodiment implicitly achieves higher power dissipation on the motor and cable resistances, as this only depends on the current magnitude, which is higher than for normal motor control, since there is an additional non zero component of current id 2705. The backspin speed is controlled by the speed controller 200, which adjusts the torque-producing current reference $i_{qref}$ 2702. Since the drive 22 does not absorb any significant power, essentially all the power generated by the motor, which acts like a generator while braking, is entirely dissipated in the load resistance comprising the motor and cable resistances. It has been discovered that this is practicable for submersible pumping applications and in particular PCPs as the long power cables 15 in FIG. 1 radically increase the load resistance. This is not the case in most industrial applications, which rely on brake resistors and other methods.

The zero power factor method can instead be operated with a positive or negative power factor. For a positive power factor, the drive will need to supply power which will then be dissipated in the cable and motor resistances, in addition to the dissipation of the power generated by the motor. This is undesirable. Operation with a negative power factor, on the other hand, corresponds to power absorption by the drive which will now have to be equipped with a brake chopper module or other means for its dissipation. The real power reference in this case may be set to the brake resistor rating instead of zero. The additional power absorption offered by the brake resistor provides the ability to increase the absorbed backspin power and hence the backspinning speed, thus draining the fluid column more quickly. This would be an application decision, as it trades the cost of a chopper module with shortened backspin time.

Figure 25:
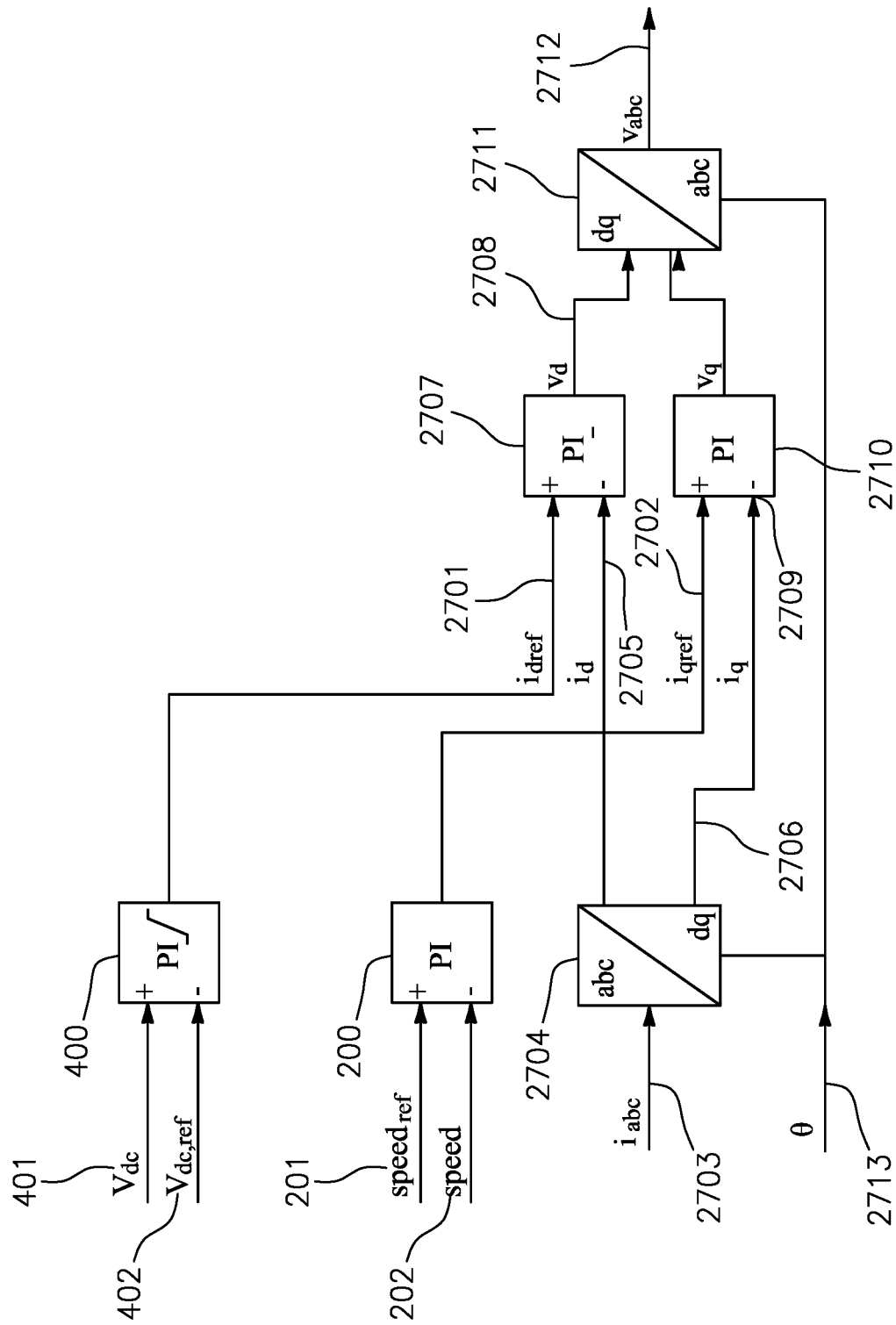
FIG. 25 is a schematic diagram of a control structure in accordance with certain embodiments of the present disclosure.

Drive 22 necessarily has power losses in the semiconductors and other components of the inverter stage 43 when it is being operated, even with zero power factor control. If the bus voltage is not being charged from the supply (power loss), it will be discharged by these losses and the inverter will cease to operate. If, however, the drive 22 is operated at a slightly negative power factor, some power from the motor will be absorbed by the inverter stage. Although referred herein as a zero power factor control there is in fact some power, enough to provide stable operation of the inverter. If this power is too high, the bus voltage will increase. If this power is too low, the bus voltage will again collapse. If the negative power factor is correctly chosen, the absorbed power will exactly match the inverter losses, and the bus voltage, and hence inverter operation, will be stable. It should be understood by those skilled in the art that if the bus voltage can be regulated, the negative power factor value will implicitly be correctly chosen. In an embodiment of zero factor power control a method includes substituting PI controller 300 in FIG. 24 with another PI controller 400 in FIG. 25, whose reference input is set to the desired bus voltage, and whose feedback input is set to the actual bus voltage. Note that the reference input $V_{dc,ref}$ 402 is subtracted from the feedback input $V_{dc}$ 401 in this case. The reference current $i_{dref}$ 2701 will thus be adjusted to ensure the power factor is at the correct negative value to hold the bus voltage constant. The reference value of the bus voltage should be set to a value 71 in FIG. 19 which is slightly higher than the normal operating voltage 62, so that the method can operate even when the supply is present (and would otherwise charge the bus voltage to its normal value). This embodiment has the further advantage that the calculations of power needed with the power PI controller from the drive voltages and currents are eliminated. Note that the concepts of using a PI controller on drive output power or bus voltage to ensure no power absorption by the drive and avoid the need for a brake chopper module can also be applied to the conventional vector control method in FIG. 4, to determine the maximum possible value of negative speed reference 201 for this method.

Sophisticated backspin control methods, such as those described hereinabove for the case of PCP pumps can be applied in the case of ESP pumps as well. Nevertheless, due to the fact that the torque, thus the power, generated by a back-spinning ESP pump is very low, the controlled power absorption applied by these methods is not expected to be necessary.

Following the aforementioned shorting or controlled draining procedures, the fluid level reaches a point at which the motor 10 could be restarted, which is represented by state 106 in FIG. 18. The success of a restart effort is subject to the motor 10 being able to provide the necessary torque, as explained hereinabove and as indicated by transition 123 in FIG. 18. However, in the case of shorting or controlled braking (state 102 in FIG. 18), the pump may still be spinning in reverse. A method for bringing the motor to a halt should therefore be applied before following the restart procedure. The advantage of using the following embodiments is that the motor 10 restart can be accomplished in a much shorter time than if waiting for the pump to naturally stop after either applying a short or a braking method or actively driving the motor in reverse.

Figure 20:
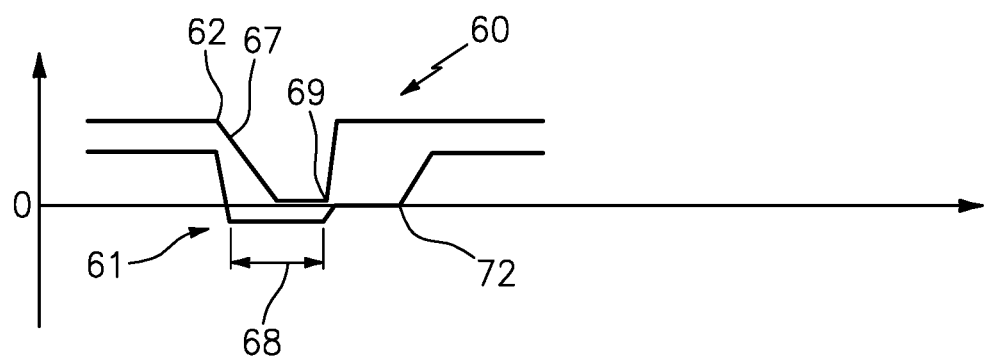
FIG. 20 is a graphical representation of the braking characteristics for a pump in accordance with certain embodiments of the present disclosure.

With specific reference to FIG. 18 state 107 and FIG. 20, an embodiment of the present disclosure includes methods of reducing the back-spinning pump speed to sensibly zero is by injecting DC current to the motor. The drive can be controlled to inject a predefined value of DC current, which will normally be a high percentage of the motor nominal current so that it can overcome the torque generated from the fluid column and decelerate the pump to a halt within one or a few rotations. In order to avoid the case of failure to achieve this, the method must preferably be used when the backspin speed and estimated torque are sensibly low.

Figure 21:
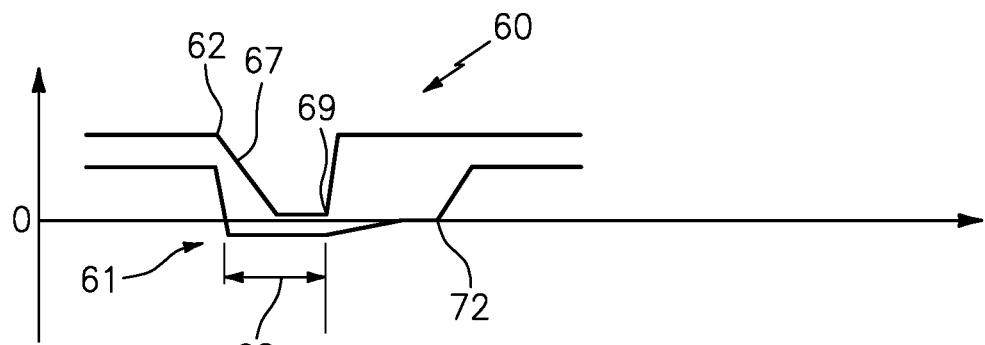
FIG. 21 is a graphical representation of the braking characteristics for a pump in accordance with certain embodiments of the present disclosure.
Figure 22:
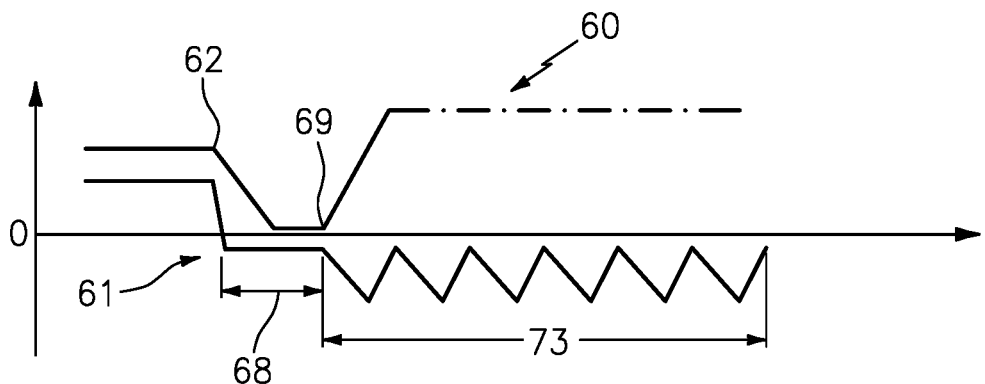
FIG. 22 is a graphical representation of the braking characteristics for a pump in accordance with certain embodiments of the present disclosure.

With specific reference to FIG. 18 state 107 and FIG. 21, a second embodiment of a method of reducing the backspinning pump speed to sensibly zero, prior to restarting in state 106 is now described. On entry to state 107 from state 101 via transition 112, the braking short is still applied and FIG. 21 shows the operation in shorting period 68, where the pump 12 is back-spinning at a safe speed. The short-circuit current of the back-spinning motor 10 during this shorting period 68 can be used with an observer to determine the speed and shaft rotation angle. If drive 22 is preferably of the vector control type, it can be adapted to release the short circuit and take control of the motor at point 69, since shaft speed, rotation angle and motor instantaneous currents are known. In this embodiment, drive 22 can then reduce the backspin speed down to zero at point 72. It will be appreciated by one skilled in the art that drive 22 could require a transition between closed-loop and open-loop control (as described herein above) when the speed reduces, since many types of observers do not work satisfactorily at very low speeds. The normal starting procedure can then be followed at point 72 to restart the motor in the forward (pumping) direction of state 102. It has to be noted that during the motor deceleration period, power needs to be absorbed by the motor, which must be dissipated on the motor-cable resistances and potentially the drive's braking resistor, if available. Alternatively, a zero power factor inverter method as hereinbefore described can be applied during this period, to avoid the need for a brake chopper module.

The foregoing description of the state diagram in FIG. 18 and a detailed description of the embodiments of the states does not limit the scope of the invention. There are many variations that could be applied by one of ordinary skill in the art. For example, state 102 in FIG. 18 is when the drive is controlling the draining of the fluid column, in a controlled draining operation of the system, so as to make it easier to restart. In some situations, it may only be necessary to partially drain the fluid column, followed by a direct transition (not shown) to state 107, where the pump is then brought to a halt prior to restarting in state 106. Conversely, in state 103 in which the pump 12 is not back-spinning, the braking short would appear to be unnecessary. However, it is possible the system to be in state 103 with the pump 12 apparently not back-spinning but after some time it does break free and start back-spinning. This might occur because the fluid column weight was very close to overcoming breakout torque and some change in the well conditions triggers breakout. In terms of FIG. 18, an additional transition from state 103 to state 101 would occur. As another example, when leaving state 100 after the drive stops and the drive detects that the pump is back-spinning and the drain option 111, or controlled draining operation, has been preselected, then the system will move from state 100 to 102 via 101. State 101 is therefore transitory and it would not be necessary to actually apply the braking short. One skilled in the art would implement the control software or hardware to deal with such special cases.

Although many of the embodiments discussed herein above relate to controlling a rotating machine based on a rotational aspect, other parameters related to rotating machinery systems can be used to control the motor and the machinery thereby. For example, embodiments of the present disclosure can control the downhole pumping system by using information provided by a downhole gauge (32 in FIG. 8), a column indication (not shown), or rate of change of the pump discharge pressure. Other parameters, such as the pressure at pump intake 14 may also be used to control the motor 10.

While the foregoing is directed to embodiments of the present invention, other and further embodiments of the invention may be devised without departing from the basic scope thereof, and the scope thereof is determined by the claims that follow.

What is claimed is:

1. A downhole pumping system connected to a supply power comprising:
    a permanent magnet motor having a plurality of phases coupled to a pump having a forward direction and a backspin direction;
    a drive configured to be electrically coupled to the supply power and configured to supply power to the permanent magnet motor; and
    a system control module electrically coupled to the drive and to the permanent magnet motor and configured to determine an occurrence of a stoppage of power the permanent magnet motor; and
    wherein the system control module is configured to determine an optimal time window after the occurrence of the stoppage of power to the permanent magnet motor; and
    wherein the downhole pumping system is configured to short the plurality of phases of the permanent magnet motor within the optimal time window using any of the system control module to close a plurality of shorting relays and the drive to apply a zero vector output.

2. The downhole pumping system of claim 1, wherein the optimal time window is determined when a rotational speed of the permanent magnet motor is less than or equal to 300 rpm.

3. The downhole pumping system of claim 2, wherein the system control module is configured to determine the rotational speed of the permanent magnet motor using any of a frequency and an amplitude of the voltages of the plurality of phases.

4. The downhole pumping system of claim 3, wherein the system control module is configured to measure a current, the frequency and the amplitude of the voltages of the plurality of phases.

5. The downhole pumping system of claim 4, wherein the system control module includes a plurality of monitoring points and a plurality of indicators for the voltage and the current, and is further configured to produce a voltage output signal and a current output signal and to produce a communications signal and to send the communications signal to an external device.

6. The downhole pumping system of claim 1, wherein the system control module includes any of a super-capacitor, a battery and an uninterruptible power supply.

7. The downhole pumping system of claim 2, wherein the rotational speed of the permanent magnet motor is a backspin speed of the permanent magnet motor.

8. The downhole pumping system of claim 7, wherein the system control module is configured to short the plurality of phases of the permanent magnet motor within the optimal time window to slow the backspin speed of the permanent magnet motor.

9. The downhole pumping system of claim 8, wherein the system control module is further configured to determine a minimum backspin speed and to release the short when the backspin speed of the permanent magnet motor is less than or equal to the minimum backspin speed.

10. The downhole pumping system of claim 9, wherein the drive is configured to operate a zero power factor control to dissipate power in the permanent magnet motor and in a cable electrically coupled to the permanent magnet motor to control the permanent magnet motor to rotate in the backspin direction after the release of the short.

11. The downhole pumping system of claim 9, wherein the drive is configured to generate a torque in the backspin direction to actively drive the permanent magnet motor in the backspin direction after the release of the short.

12. A system for controlling an operation of a downhole pumping system including a pump, the system comprising:
    a polyphase downhole permanent magnet motor coupled to the pump having a forward direction and a backspin direction;

a drive configured to supply power to the polyphase downhole permanent magnet motor;

a system control module electrically coupled to the drive and to the polyphase downhole permanent magnet motor configured to determine an occurrence of a stoppage of power to the polyphase downhole permanent magnet motor; and wherein the system control module is configured to determine an optimal time window after the occurrence of the stoppage of power to the polyphase downhole permanent magnet motor; and wherein the downhole pumping system is configured to short a plurality of phases of the polyphase downhole permanent magnet motor within the optimal time window using any of the system control module to close a plurality of shorting relays and the drive to apply a zero vector output.

13. The system of claim 12, wherein the optimal time window is determined when a rotational speed of the polyphase downhole permanent magnet motor is less than or equal to 300 rpm.

14. The system of claim 13, wherein the plurality of shorting relays are electrically coupled to ground.

15. The system of claim 12, wherein the system control module includes any of a super-capacitor, a battery and an uninterruptible power supply.

16. The system of claim 14, wherein the system control module includes a plurality of monitoring points and a plurality of indicators for the voltage and a current, and is further configured to produce a voltage output signal and a current output signal and to produce a communications signal and to send the communications signal to an external device.

17. The system of claim 12, wherein system control module is configured to determine a rotational speed of the polyphase downhole permanent magnet motor using any of a frequency and an amplitude of the voltages of the polyphase downhole permanent magnet motor.

18. The system of claim 12, further comprising the drive configured to apply a zero power factor output to the polyphase downhole permanent magnet motor to dissipate power in the polyphase downhole permanent magnet motor and in a cable electrically coupled to the polyphase downhole permanent magnet motor to control the polyphase downhole permanent magnet motor to rotate in the backspin direction after a release of the short to the polyphase downhole permanent magnet motor.

19. The system of claim 13, wherein the rotational speed of the polyphase downhole permanent magnet motor is a backspin speed of the polyphase downhole permanent magnet motor.

20. The system of claim 19, wherein the system control module is configured to short a plurality of phases of the polyphase downhole permanent magnet motor within the optimal time window to slow the backspin speed of the polyphase downhole permanent magnet motor.

21. The system of claim 12, wherein the pump is one of an ESP or a PCP type pump.

22. The system of claim 12, wherein the drive is a sensorless drive.

23. The system of claim 20 wherein the system control module is further configured to determine a minimum backspin speed and to release the short when the backspin speed of the polyphase downhole permanent magnet motor is less than or equal to the minimum backspin speed.

24. The system of claim 23 wherein the drive is configured to generate a torque in the backspin direction to actively drive the polyphase downhole permanent magnet motor in the backspin direction after the release of the short.

25. A method for controlling an operation of a downhole pumping system including a pump, having a system control module coupled to a drive wherein the pump is driven by a motor; said method comprising:

determining an occurrence of a stoppage of power to the motor;

determining, with the system control module, an optimal time window after the occurrence of the stoppage of power to the motor;

performing a controlled draining operation of the downhole pumping system during the optimal time window; and wherein the controlled draining operation comprises shorting a plurality of phases of the motor.

26. The method of claim 25 wherein the shorting a plurality of phases of the motor comprises any of closing the plurality of shorting relays using the system control module and applying a zero vector output using the drive.

27. The method of claim 26, further comprising determining a rotational speed of the motor and wherein the an optimal time window is when the rotational speed of the motor is less than or equal to 300 rpm.

28. The method of claim 27, wherein the rotational speed of the motor is a backspin speed of the motor.

29. The method of claim 26 wherein the controlled draining operation further comprises:

releasing the shorting of the plurality of the phases of the motor; and applying a zero power factor control.

30. The method of claim 26 further comprising releasing the shorting of the plurality of the phases of the motor and driving the motor in a backward rotational direction.

31. The method of claim 26 wherein the system control module includes any of a super-capacitor, a battery and an uninterruptible power supply.

32. The method of claim 28, wherein the shorting the plurality of phases of the motor within the optimal time window and slowing the backspin speed of the motor.

33. The method of claim 32, further comprising determining a minimum backspin speed and releasing the shorting when the backspin speed of the motor is less than or equal to the minimum backspin speed.

34. The method of claim 27, wherein determining the rotational speed of the motor using any of a frequency and an amplitude of the voltages of the plurality of phases.

35. The method of claim 34, further comprising measuring a current, the frequency and the amplitude of the voltages of the plurality of phases.

36. The method of claim 35, further comprising:

producing a voltage output signal and a current output signal;

producing a communications signal; and sending the communications signal to an external device.

37. The method of claim 29, further comprising performing a pumping down operation.

38. The method of claim 37, further comprising driving the motor in a forward rotational direction after performing the pumping down operation.

39. The method of claim 25 wherein the downhole pumping system further includes a column of fluid positioned above the pump and wherein the column of fluid includes sand and wherein performing the controlled draining operation occurs at a rate greater than a sand particle settling rate to prevent the sand from blocking the pump.

40. The method of claim 29, further comprising releasing the zero power factor control and driving the motor in a forward rotational direction.

41. The method of claim 26, further comprising driving the motor in a forward direction after the controlled draining operation.

\* \* \* \* \*